US010496268B2

(12) United States Patent
Donahue et al.

(10) Patent No.: US 10,496,268 B2
(45) Date of Patent: Dec. 3, 2019

(54) CONTENT TRANSFER TO NON-RUNNING TARGETS

(71) Applicant: Microsoft Technology Licensing, Redmond, WA (US)

(72) Inventors: Tyler J. Donahue, Bellevue, WA (US); Clement Basile Fauchere, Sammamish, WA (US); Emily Grace Sappington, Seattle, WA (US); Steven J. Frederickson, Seattle, WA (US); Gregory T. Mattox, Jr., Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 481 days.

(21) Appl. No.: 15/432,867

(22) Filed: Feb. 14, 2017

(65) Prior Publication Data

US 2017/0160896 A1 Jun. 8, 2017

Related U.S. Application Data

(63) Continuation of application No. 14/540,910, filed on Nov. 13, 2014, now Pat. No. 9,612,732.

(51) Int. Cl.
*G06F 3/0484* (2013.01)
*G06F 3/0486* (2013.01)
(Continued)

(52) U.S. Cl.
CPC .......... *G06F 3/0486* (2013.01); *G06F 3/0482* (2013.01); *G06F 3/04842* (2013.01);
(Continued)

(58) Field of Classification Search
CPC .................................................. G06F 3/0484
(Continued)

(56) References Cited

U.S. PATENT DOCUMENTS

| 5,548,702 A | * | 8/1996 | Li | G06F 3/0485 |
|---|---|---|---|---|
| | | | | 715/769 |
| 6,535,230 B1 | * | 3/2003 | Celik | G06F 3/0486 |
| | | | | 715/769 |

(Continued)

FOREIGN PATENT DOCUMENTS

WO WO-2014003781 1/2014

OTHER PUBLICATIONS

"Dragging and Dropping Objects Between Full Screen Applications", Retrieved From: <http://www.chami.com/tips/windows/111696W.html> Sep. 30, 2014, 2009, 1 page.

(Continued)

*Primary Examiner* — Reza Nabi
(74) *Attorney, Agent, or Firm* — Davin Chin; Chin IP, PLLC

(57) ABSTRACT

Techniques and apparatuses for content transfers to non-running targets in a multi-application environment are described herein. An input can be detected to relocate a content item exposed within a graphical user interface for the multi-application environment. The relocation associates the content item with a target element that initiates one or more designated actions with respect to the content item by invoking a corresponding application currently in a non-running state. The input to relocate the content item includes the content item being placed at an intermediate holding place that is displayed within the graphical user interface, and the content item being copied from the intermediate holding place to the target element. In response to the detected input, the content item is associated with the target element and the corresponding application is launched, switching from the non-running state to an active state in which the one or more designated actions are performed.

20 Claims, 14 Drawing Sheets

(51) Int. Cl.
 *G06F 9/46* (2006.01)
 *G06F 9/54* (2006.01)
 *G06F 3/0482* (2013.01)
 *G06F 9/48* (2006.01)

(52) U.S. Cl.
 CPC ............ *G06F 3/04845* (2013.01); *G06F 9/46* (2013.01); *G06F 9/543* (2013.01); *G06F 9/4843* (2013.01); *G06F 2209/482* (2013.01)

(58) Field of Classification Search
 USPC ....................................................... 715/862
 See application file for complete search history.

(56) References Cited

U.S. PATENT DOCUMENTS

| | | | | |
|---|---|---|---|---|
| 6,628,309 | B1* | 9/2003 | Dodson | G06F 3/0486 715/769 |
| 8,191,003 | B2* | 5/2012 | Brown | G06F 3/0486 715/769 |
| 8,701,030 | B2* | 4/2014 | Lyons | G06F 3/0486 709/213 |
| 9,612,732 | B2 | 4/2017 | Donahue et al. | |
| 2003/0076362 | A1* | 4/2003 | Terada | G06F 3/0486 715/781 |
| 2005/0060653 | A1* | 3/2005 | Fukase | G06F 3/0486 715/724 |
| 2007/0226642 | A1* | 9/2007 | Soulier | G06F 3/0486 715/768 |
| 2009/0106680 | A1* | 4/2009 | Brownholtz | G06F 3/0486 715/769 |
| 2009/0249239 | A1* | 10/2009 | Eilers | G06F 3/0486 715/769 |
| 2009/0276701 | A1* | 11/2009 | Nurmi | G06F 3/0238 715/702 |
| 2011/0260997 | A1* | 10/2011 | Ozaki | G06F 1/1618 345/173 |
| 2011/0320962 | A1* | 12/2011 | Naganawa | G06F 3/0481 715/753 |
| 2012/0131483 | A1* | 5/2012 | Archer | G06F 16/957 715/766 |
| 2013/0132868 | A1* | 5/2013 | Hackett | G06F 3/0486 715/760 |
| 2013/0174070 | A1* | 7/2013 | Briand | G06F 3/04817 715/769 |
| 2013/0332872 | A1* | 12/2013 | Grinberg | G06F 3/0486 715/769 |
| 2014/0006967 | A1* | 1/2014 | Arumugam | G06F 9/54 715/748 |
| 2014/0096049 | A1* | 4/2014 | Vonshak | G06F 3/048 715/769 |
| 2014/0289662 | A1* | 9/2014 | Morita | G06F 3/04883 715/769 |
| 2015/0135111 | A1* | 5/2015 | Burckart | G06F 3/0486 715/769 |
| 2016/0139776 | A1* | 5/2016 | Donahue | G06F 3/04845 715/781 |

OTHER PUBLICATIONS

"Drag and Drop (OLE)", Reteived From: <http://msdn.microsoft.com/en-us/library/96826a87.aspx> Oct. 6, 2014, 2013, 1 page.

"Notice of Allowance", U.S. Appl. No. 14/540,910, dated Nov. 21, 2016, 17 pages.

"Drag and Drop Across (Fullscreen) Applications, Switching Via Alt-Tab", Retrieved From: <http://askubuntu.com/questions/37335/drag-and-drop-across-fullscreen-applications-switching-via-alt-tab> Sep. 30, 2014, Nov. 17, 2012, 3 pages.

* cited by examiner

CONTENT TRANSFER TO NON-RUNNING TARGETS

RELATED APPLICATION

This application is a continuation of and claims priority to U.S. patent application Ser. No. 14/540,910 filed Nov. 13, 2014 entitled "Content Transfer to Non-Running Targets", the disclosure of which is incorporated by reference herein in its entirety.

BACKGROUND

Conventional operating systems permit users to view multiple computing applications through windows. Each of these windows generally includes a frame or control for selecting which window is focused or to move, size, or otherwise manage placement of the window with respect to a workspace and other windows. These frames or controls, however, often only enable interaction with a currently active window and can result in unintended occlusion and overlap between the windows. Moreover, underlying applications associated with windows may be suspended in some cases and generally must be launched and running before content may be manipulated via the applications. Accordingly, interaction with multiple windows to handle content items may require a user to perform a series of tasks to activate, launch, position, and/or size each window as desired. As such, managing the layout of multiple windows in this fashion can be overly complicated, time-consuming, and frustrating to users.

SUMMARY

Techniques and apparatuses for content transfers to non-running targets in a multi-application environment are described herein. The multi-application environment described herein presents one or more application windows, which can be sized, positioned, or layered to provide interaction with functionality provided by corresponding applications. In one or more implementations, input is detected to relocate a content item exposed within a graphical user interface for a multi-application environment. The relocation may be performed to associate the content item with a target element that is configured to initiate one or more designated actions with respect to the content item by invoking a corresponding application currently in a non-running state. The target element may be configured as an application window, an icon, an application launch element, or other visual representation of the corresponding application. In response to the detected input, the content item is associated with the target element and the corresponding application is launched to cause a switch from the non-running state to an active state in which the one or more designated actions are performed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

Figure 1:
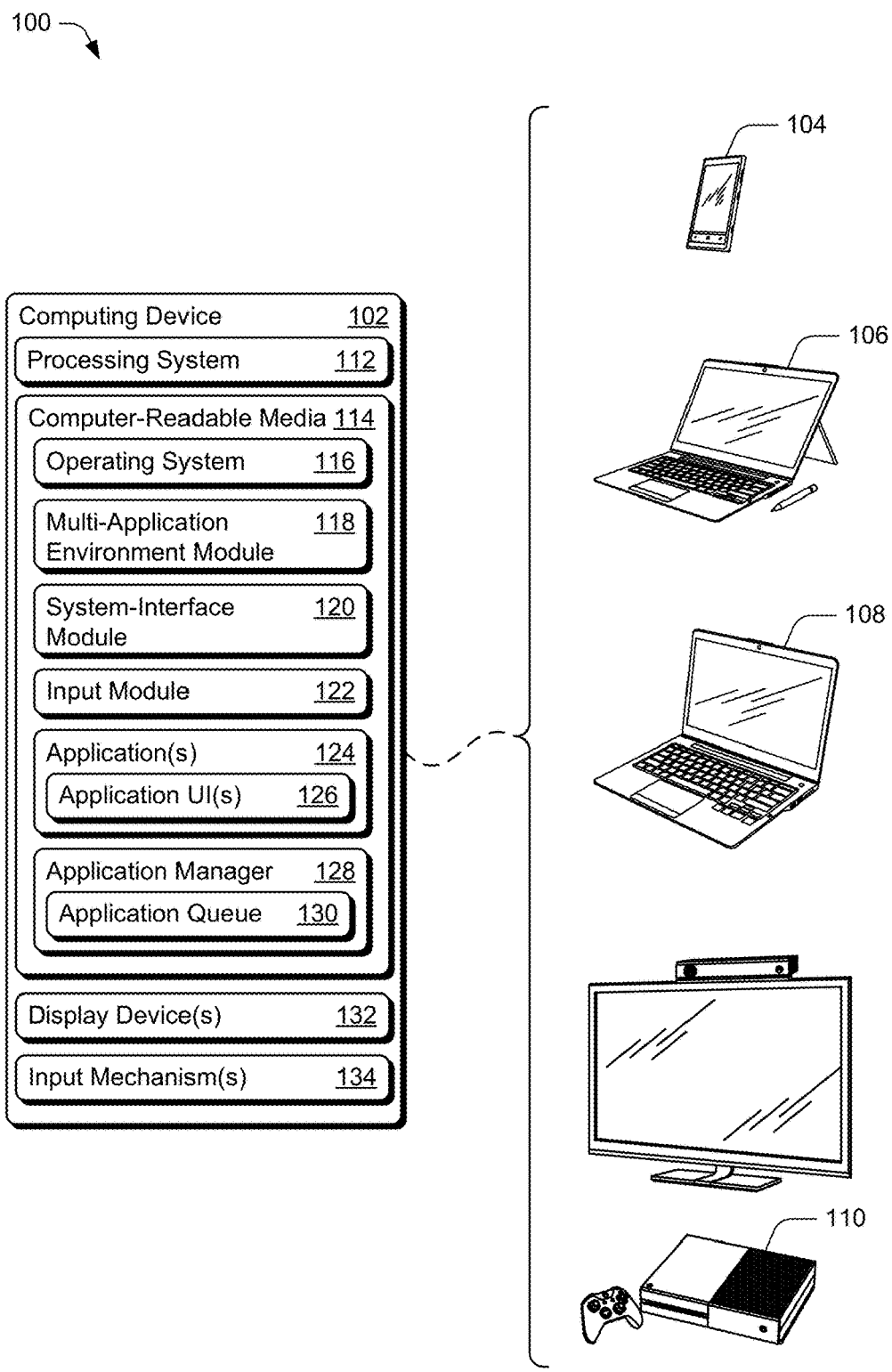
FIG. 1 is an illustration of an example operating environment that is operable to employ techniques for content transfers to non-running targets.

Underlying applications associated with windows generally must be launched and running before content may be manipulated via the applications. Accordingly, interaction with multiple windows to handle content items may require a user to perform a series of tasks to activate, launch, position, and/or size each window as desired. As such, managing the layout of multiple windows in this fashion can be overly complicated, time-consuming, and frustrating to users.

Techniques and apparatuses for content transfers to non-running targets (e.g., closed or suspended applications) in a multi-application environment are described herein. The multi-application environment described herein presents one or more application windows, which can be sized, positioned, or layered to provide interaction with functionality provided by corresponding applications. In one or more implementations, input is detected to relocate a content item (e.g., a file, structured data, a content object, field data, an image, copied text, etc.) exposed within a graphical user interface for a multi-application environment. In one or more implementations, the input may specify a drag and drop operation applied to the content item, although other types of input suitable to manipulate content items is also contemplated. The relocation may be performed to associate the content item with a target element that is configured to initiate one or more designated actions with respect to the content item by invoking a corresponding application currently in a non-running state. The target element may be configured as an application window, an icon, an application launch element, or other visual representation of the corresponding application. In response to the detected input, the content item is associated with the target element and the corresponding application is launched (or resumed from being suspended) to cause a switch from the non-running state to an active state in which the one or more designated actions are performed.

Enabling users to transfer content items to non-running targets as described in this document (such as transfers to a closed application or application in a suspended state) makes the transfers more convenient to users and more efficient. Moreover, users may avoid having to set up the organization of application windows by launching, moving, resizing, etc., before starting a drag operation or other operations to transfer the content. Thus, navigation to access functionality and interact with content via a user interface may be performed quickly with simplified operations. Additionally, applications that are not actively being used may remain in a closed or suspended state longer, which may conserve processing resources, reduce power consumption, and/or extend battery of a computing system.

In the following discussion, an example environment is first described that may employ the techniques described herein. Example details and procedures are then described which may be implemented in the example environment as well as other environments. Consequently, the example details and procedures are not limited to the example environment and the example environment is not limited to the example details and procedures. Lastly, an example system and components of the system are discussed that may be employed to implement aspects of the techniques described herein.

Example Environment

FIG. 1 is an illustration of an environment 100 in an example implementation that is operable to employ techniques described herein. The illustrated environment 100 includes a computing device 102 that may be configured in a variety of ways. For example, a computing device may be configured as a smart phone computer 104, a tablet computing device 106, a laptop computer 108, and a gaming device 110 as illustrated in FIG. 1. Other computing devices and systems are also contemplated, such as set-top boxes, servers, and netbooks, and so forth. The computing device may range from full resource devices with substantial memory and processor resources (e.g., personal computers, game consoles, tablets) to a low-resource device with limited memory and/or processing resources (e.g., traditional set-top boxes, hand-held game consoles, mobile phones). Additionally, although a single computing device is shown in some instances, the computing device may be representative of a plurality of different devices. Further examples of computing systems and devices suitable to implement techniques described herein are described below in relation to FIG. 14.

In the illustrated example, the computing device 102 includes a processing system 112 having one or more processing devices and computer-readable media 114 configured to implement various application programs, modules, logic, and/or device functionality. For instance, the computer-readable media 114 may include an operating system 116, multi-application environment module 118, system-interface module 120, input module 122, application(s) 124, each having one or more application user interfaces 126 (application UI(s) 126), and an application manager 128, which includes or has access to an application queue 130.

The computing device 102 additionally may include or otherwise make use of one or more display devices 132 and input mechanisms 134. Display devices 132 may be separate or integrated with the computing device 102. Input mechanisms 134 may include gesture-sensitive sensors and devices, such as touch-based sensors and movement-tracking sensors (e.g., camera-based), as well as mice (free-standing or integral with a keyboard), a stylus, touch pads, accelerometers, and microphones with accompanying voice recognition software, to name a few. Input mechanisms 134 may be separate or integrated with displays device 132. Integrated examples may include gesture-sensitive displays with integrated touch-sensitive or motion-sensitive sensors.

The operating system 116 manages resources of the computing device 102 and may be implemented using any suitable instruction format, such as 64-bit, 32-bit, reduced instruction set computing (RISC), complex instruction set computing (CISC), and the like. The operating system is configured to abstract underlying functionality of the underlying device to applications that are executable on the computing device. For example, the operating system 116 may abstract processing, memory, network, and/or display functionality such that the applications 124 may be written without knowing "how" this underlying functionality is implemented. The applications, for instance, may provide data to the operating system to be rendered and displayed by a display device without understanding how this rendering will be performed. A variety of applications typically associated with client devices are contemplated including, but not limited to, a productivity suite that integrates multiple office productivity modules, a web browser, games, a multi-media player, a word processor, a spreadsheet program, a photo manager, and so forth.

The multi-application environment module 118 provides a multi-application environment by which a user may view and interact with one or more of applications 124 through application UIs 126, which are presented via respective application windows. The multi-application environment module 118 may be provided via the operating system 116 in various ways. In some cases, the multi-application environment is an overlapping windowing environment or workspace (e.g., "desktop") that enables management or manipulation of a position, size, and/or front-to-back ordering (collectively, "placement") of overlapping windows (e.g., the z-ordering of the windows) or non-overlapping windows. Multi-application environment module 118 may present application UIs 126 through application windows having frames. These frames may provide controls through which to interact with an application and/or controls enabling a user to position and size the window. Alternately or additionally, multi-application environment module 118 may present application UIs 126 through application windows having little or no window frame, and/or without presenting visual controls (e.g., permanent controls on a window frame or in a window obscuring content).

The multi-application environment enabled by multi-application environment module 118 can be, but is not required to be, hosted and/or surfaced without use of a windows-based desktop environment. Thus, in some cases multi-application environment module 118 presents a multi-application environment as an immersive environment and precludes usage of desktop-like displays (e.g., a taskbar). Further still, in some embodiments this multi-application environment is similar to an operating system in that it is not closeable or capable of being un-installed. While not required, in some cases this multi-application environment enables use of all or nearly all of the pixels of a display by applications within the multi-application environment.

System-interface module 120 provides one or more interfaces through which interaction with operating system 116 is enabled, such as an application-launching interface or "application picker", a task bar, a start menu, a control panel, or a system tools or options menu, to name just a few. Input module 122 receives input through the application windows, input mechanisms 134, or other controls and affordances of a multi-application environment.

Each application 124 includes one or more application UIs 126, which enables viewing or interaction with content of the application. Application UIs 126 may include predefined properties or preferences (e.g., default values or settings) for presenting an application 124, such as an aspect ratio, maximum size, minimum size, position, priority, display orientation, and the like. Application manager 128 enables management of applications 124, such as launching and terminating applications, switching between application windows, selecting states for applications as active or suspended, and tracking active applications. In some cases, the application manager 128 enables relationships between applications to be established and maintained, such as applications that are frequently launched, positioned, or used within close proximity to each other. Application manager 128 may also have access to, or maintain, application queue 130, which may include active applications, minimized applications, or previously-interacted-with applications. Applications of application queue 130 may be organized in any suitable fashion, such as most-recently-used, most-frequently-used, alphabetically, by application association, or by application grouping.

When an application is not in the foreground or otherwise not actively being used, execution for the application may be suspended and the application may be unable to run code. As noted, the application manager 128 may enable non-running states for applications, which prevent applications from running while in the background, out of view, and/or in a deprioritized position in the application queue 130. By so doing, memory and processing resources may be preserved for use by applications running in the foreground. Thus, applications within a multi-application environment may include a combination of some running/active applications in active states and some non-running/suspended applications in suspended state, or closed states.

Application manager 128 may also represent functionality to implement techniques for content transfer to non-running targets described above and below. This may include but is not limited to operations to recognize input indicative of relocation of source content from a source to a target, such as via a drag and drop or other suitable input. In one approach, the application manager 128 may interact with the input module 122 to monitor, recognize, and perform processing responsive to suitable input. When input is indicative of transfer of content from a source to a non-running application associated with a target (e.g., a suspended application window, application launcher element, or icon for an application) the application manager 128 may operate to initiate transfer of the data for selected content to the target and/or launch the associated application. Application manager 128 may also cause a switch of the application from the non-running state to an active state in which the one or more designated actions may be performed with respect to the content.

Any or all of operating system 116, multi-application environment module 118, system-interface module 120, input module 122, application(s) 124, and application manager 128 may be implemented as separate components or combined or integrated together in different combinations in any suitable form.

Having considered the foregoing example environment, consider now a discussion of some example details and procedures for composite partition function techniques in accordance with one or more implementations.

Content Transfer to Non-Running Target Details

This section discusses details of techniques and example procedures that may be used for content transfers to non-running targets in accordance with one or more implementations. Generally speaking, a multi-application environment may be provided that enables multi-tasking with multiple applications and application windows at the same time. The operating system 116 through the application manager 128 and/or other components and functionality may manage allocation of resources for execution of the multiple applications. Moreover, the multi-application environment may be configured to enable content transfers to non-running targets as described above and below. For example, data selected from an application window associated with an active, running application may be dragged and dropped onto a target, such as a background window or application launch element associated with a suspended or non-running application. This action causes transfer of the selected data to the target and in some cases activation of the corresponding application into an active, running state. This process may occur without a user having to make explicit selections in advance of the transfer to launch the non-running application, arrange application windows, and so forth.

Figure 2:
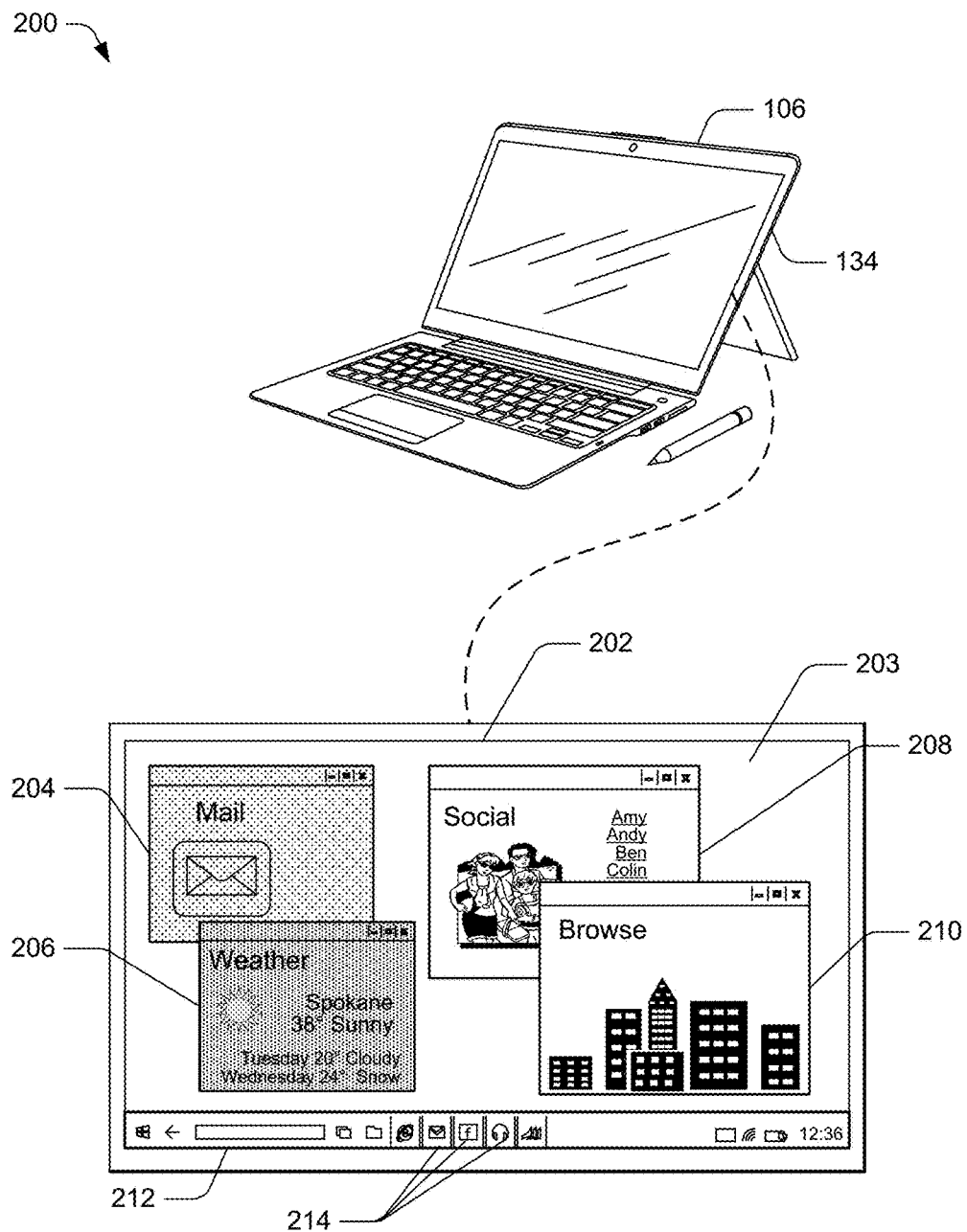
FIG. 2 illustrates an example computing device having a user interface for a multi-application environment in accordance with one or more implementations.

FIG. 2 illustrates generally at 200 an example computing device 102 having a user interface 202 for a multi-application environment 203 in accordance with one or more implementations. In this particular example, the computing device 102 in the form of a tablet is depicted as rendering the user interface 202 via a display device 134. In at least some embodiments, multi-application environment 202, or a section thereof, fully occupies a screen or visible area of a display. As such, edges of multi-application environment 202 may align with respective edges of the screen or visible area of the display.

Here, the multi-application environment 203, which may also be referred to as a workspace or desktop, includes multiple representative examples of application windows for different application. The illustrated application windows include windows corresponding to mail 204, weather 206, social 208, and browser 210 applications. The applications and corresponding windows may expose content items and provide different kinds of functionality for interaction with the content items. Content items may include, but are not limited to, data files, images, audio, structured data, objects, video files, textual items, and so forth.

Notice that windows for the mail 204 and weather 206 applications that in this example are depicted as being shaded to represent that these applications are in a non-running state. For example, the applications may be suspended such that processing for the application is not actively occurring. As depicted, application windows for these application may still appear in the multi-application environment 203. In this case, a captured image (e.g., snapshot or thumbnail) captured when the application was previously in an active state may be used to visually represent the application within the user interface. On the other hand, the example windows for the social 208 and browser 210 applications may represent active, running application and therefore are not shaded.

Shading is employed herein as but one example of a visual cue that may be employed to distinguish between running and non-running items within a multi-application environment 203. Naturally, other types of visual cues may be employed in addition to or as an alternative to shading, examples of which include different borders, transparency settings, coloration, animations, and/or other visualizations suitable to distinguish between running and non-running items.

In another approach, visual distinctions such as shading may not be employed at all, in which case the state of applications associated with windows and other items exposed in the user interface may not be made visually apparent to users. In this approach, users may seamlessly switch back and forth between windows without realizing that behind the scenes the system is making corresponding changes to application states to allocate computing resources efficiently.

Additionally, the multi-application environment 203 may include a control area that may provide application picker functionality, such as a menu system, tool bar, application launch window, application tile view, and so forth. The control area or application picker in the example of FIG. 2 is configured as a task bar 212. The task bar 212 enables access to features and functions of the operating system 116, system-interface module 120, or other applications 124 of computing device 102. For example, application windows can be launched or switched from task bar 212 using visual representations 214 of the application, which may be in the form of tiles, application icons, labels, buttons, menu items, thumbnail images, or other suitable application launch elements configured to facilitate interaction with application windows.

Various visual representations of non-running applications may act as targets for transfer of content from a source to the non-running application as described herein. Visual representations include, but are not limited to, application windows, captured images of windows, and/or visual representations 214 that act as application launch elements as noted above. As also described later in this document, content items may also be transferred to entities such as people, devices, groups, smart appliances, locations (websites, service, URLs) and so forth, through corresponding representations of the entities. Details regarding these and other aspects of content transfers to non-running targets are discussed in relation to the example scenarios of FIGS. 3-10 and the example procedures of FIGS. 11-13 that follow.

Example Scenarios

Figure 3:
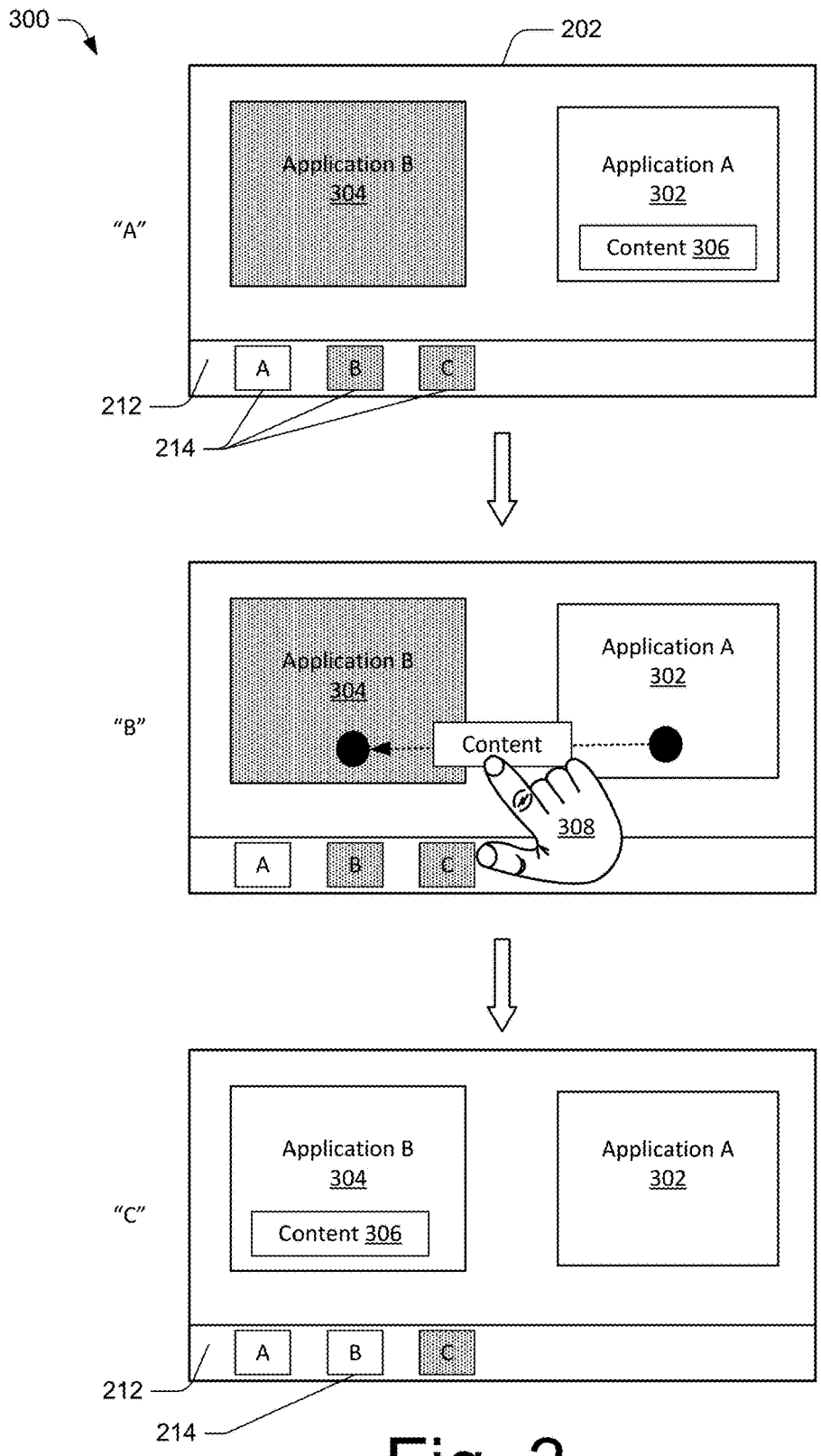
FIG. 3 illustrates an example scenario for transfer of content in a multi-application environment in accordance with one or more implementations.

FIG. 3 illustrates generally at 300 an example scenario for transfer of content in a multi-application environment in accordance with one or more implementations. In this example, a series of views of a user interface 202 for the multi-application environment represented by different letters "A" to "C" are depicted, which illustrate operations in a sequence to transfer content between applications. For example, FIG. 3 depicts in view "A" the multi-application environment 202 as exposing windows associated with application A 302 and application B 304. Application A 302 represents a running application in an active state that acts as a source of content 306. Application B 304 represents a non-running application that may in a suspended or closed state and may act as a target for the content 306. Here, the window for application B 304 may show a captured image (e.g., snapshot or thumbnail) from a time when application B was running as noted above. Shading is also used to indicate that application B is not running. Throughout the scenarios described in this section shading is used as an example of a visual cue to distinguish between active and non-running/non-active items, although other visual cues may be used in the alternative or no visual cues at all may be used, as mentioned previously.

View "A" also represents a task bar 212 which may include visual representations 214 corresponding to applications as noted previously. The visual representations 214 may be selectable to launch and/or switch between corresponding applications. Visual representations 214 may also act as targets for content 306 using the techniques described herein. Note that the example visual representations and example windows exposed in view "A" reflect that application A is launched and active, application B is available via a window in the user interface 202 but is suspended, and application C is closed and/or suspended in the background such that an application window for application C does not appear in the interface.

View "B" represents interaction 308 which generates input to trigger transfer of the content from running application A to non-running application B. The input may be recognized and processed by way of various components to effectuate the transfer of content between the applications. By way of example and not limitation, the interaction 308 in FIG. 3 represents touch interaction to apply a drag and drop operation to the content 306. This may involve selection of visual representation of the content 306 from within the window for application A (e.g., the source), dragging or other suitable input to move/relocate the visual representation across the interface to within the window/captured image for application B (e.g., the target), and releasing or otherwise concluding the interaction to drop/place the visual representation within the boundaries associated with the window/captured image for application. Other types of interaction 308 are also contemplated such as using a mouse or other input device, keystrokes, a defined gesture to select and move the content, a sequence of clicks to select the content and then the target, or other interaction to relocate the content from a source to a target.

The drag and drop action (or other interaction 308) causes association of the content 306 with application as represented in view "C". In addition, the interaction 308 may initiate a switch of application B from a non-running state to a running state in which one or more actions performable with respect to the content 306 may occur. This switch occurs responsive to the interaction to relocate the content item and without explicit launching of the application separately from the transfer operation. To represent the change in states, both the window for application B and the visual representation 214 for application B in the taskbar in view "C" have switched from shaded to un-shaded. Comparable changes in shading are employed in the discussion of additional scenarios below to represent state changes that may occur in accordance with the described techniques.

Figure 4:
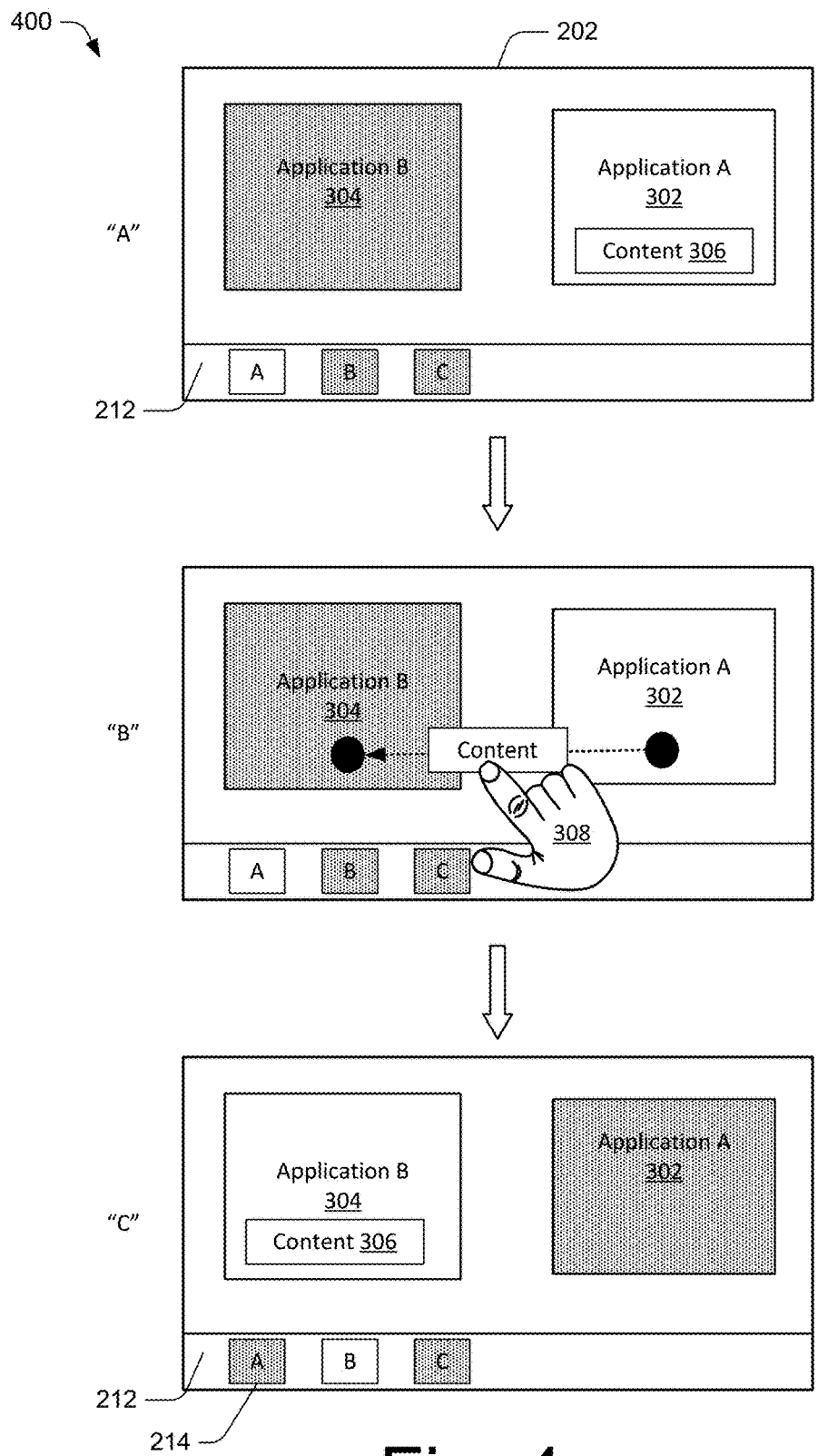
FIG. 4 illustrates another example scenario for transfer of content in a multi-application environment in accordance with one or more implementations.

FIG. 4 illustrates generally at 400 another example scenario for transfer of content in a multi-application environment in accordance with one or more implementations. In particular, FIG. 4 depicts an example in which, in addition to transferring content and activating an application associated with a target, the source application from which content is obtained is switched into a non-running state. Thus, the scenario represented in FIG. 4 shows similar views as the example views discussed in relation to FIG. 3 except that in view "C" of FIG. 4, the window associated with application A as well as the visual representation 214 for application A have been shaded to reflect that application has been deactivated and/or placed into a non-running state responsive to the interaction 308. Accordingly, FIG. 4 represents that transfer of content from a source window to a target window, via a drag and drop or otherwise, may additionally cause a corresponding switch in the states of underlying applications. Switching the source application to a non-running state occurs to conserve computing resources. Here, the switch of the target to active and the source to inactive may be performed due to the inference that a user is likely transferring the content to perform/initiate actions via the target application and therefore the source application may be idle during a period of time in which the target application is actively being used.

Figure 5:
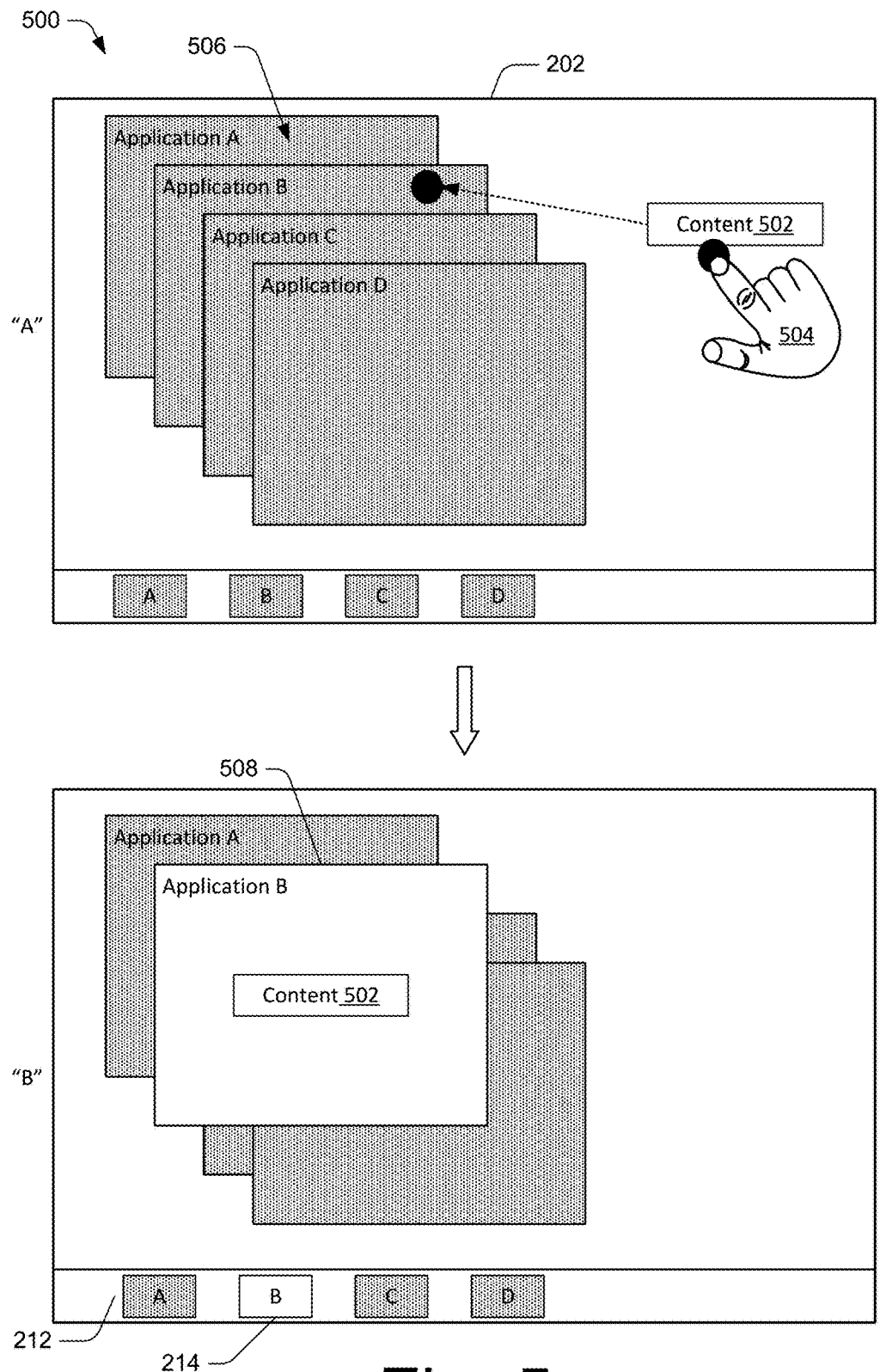
FIG. 5 illustrates a further example scenario for transfer of content in a multi-application environment in accordance with one or more implementations.

FIG. 5 illustrates generally at 500 a further example scenario for transfer of content in a multi-application environment in accordance with one or more implementations. In particular, FIG. 5 depicts an example in which content 502 from a source is transferred via interaction 504 to a target window within an arrangement 506 of multiple windows in the user interface 202. Here, view "A" represents windows for applications A thru D as being arranged in a stack of overlapping windows. Naturally, other types of arrangements of multiple windows are also contemplated. In this example, each of the windows is represented as being associated with a non-running application. Keeping windows in non-running states prior to the relocation of content preserves computing resources for other, active operations. Arrangements of some running and some non-running applications are also possible.

Interaction 504 here may again involve selecting and dragging the content to a target within the arrangement 506 or otherwise providing input to relocate the content 502 to a target. The illustrated example shows relocation of the content from a workspace or desktop of the user interface 202, which acts as the source of the content 504 in this example. Of course an application window for another application within the arrangement 506 or separate from the arrangement may also act as a source for content 502.

Interaction 504 is performed to select a selected one of the windows/applications from the arrangement 506. In one approach, the selection may be made by dropping or concluding the interaction within boundaries of one of the windows. In addition or alternatively, interaction 504 may involve dwelling or hovering for a predefined and/or configurable time period within boundaries of one of the windows, which is effective to cause the selection of the window over which the dwell/hover occurs as the target. Other suitable techniques to select a target are also contemplated.

However the selection of a target from the arrangement occurs, the selection initiates transfer of data associated with the content 502 to the application corresponding to the target, and may also cause launch of the application to switch to a running state if appropriate and enable actions via the application with respect to the content 502. For example, view "B" of FIG. 5 illustrates selection of a window 508 corresponding to application B, which results in the window 508 being moved to the foreground in front of other windows in the arrangement 506. Moreover, the content is associated with the target and underlying application B, and application B is now in a running state as indicated by the change in shading. A change in the shading of the visual representation 214 for application B in the task bar 212 is also depicted.

Figure 6:
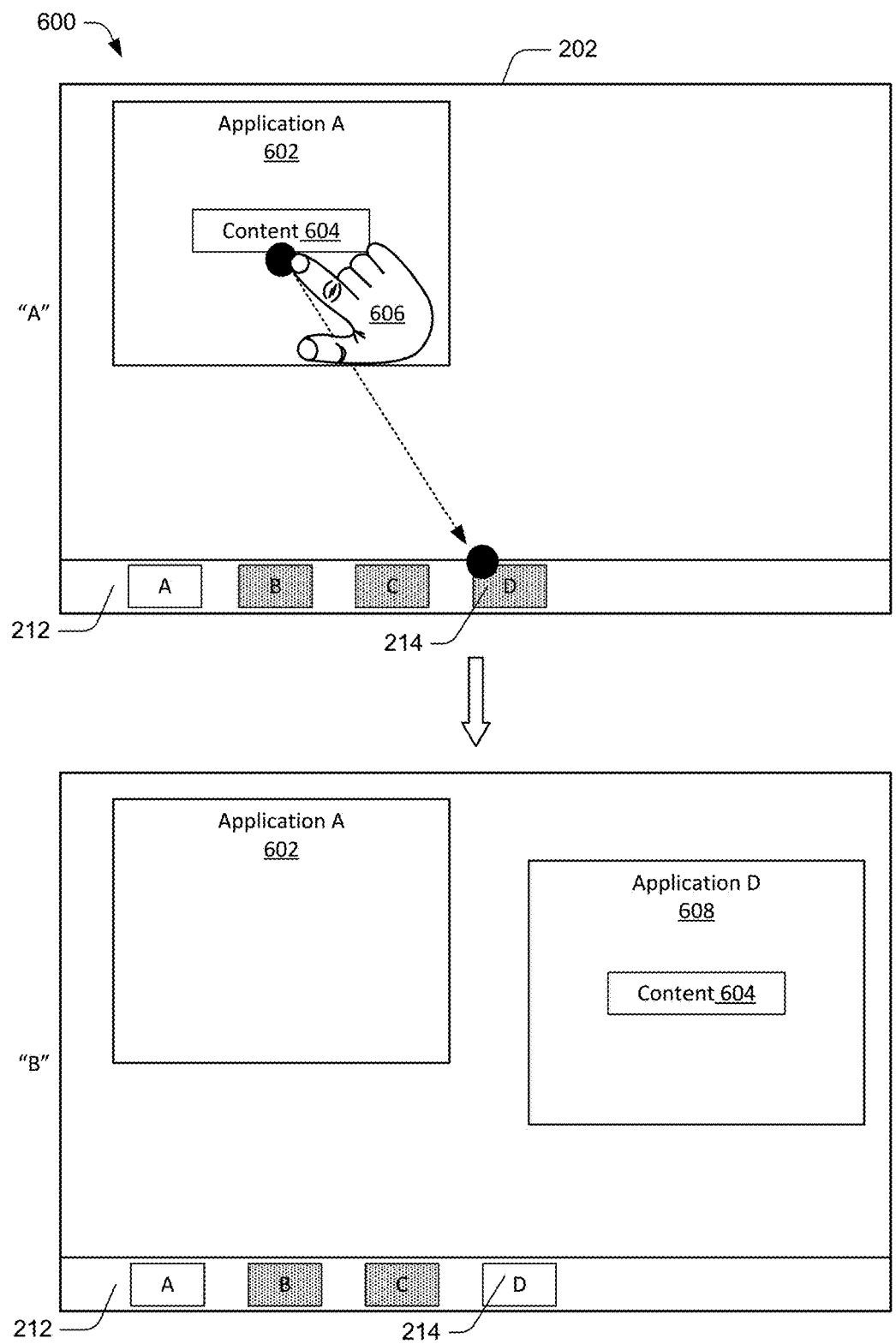
FIG. 6 illustrates an additional example scenario for transfer of content in a multi-application environment in accordance with one or more implementations.

FIG. 6 illustrates generally at 600 an additional example scenario for transfer of content in a multi-application environment in accordance with one or more implementations. In this example, transfer of content occurs from a source to a target that is configured as a visual representation for an application, such as various visual representation 214 discussed previously. The visual representation may be a user interface instrumentality that is selectable to launch a corresponding application, such as tiles, application icons, labels, buttons, menu items, thumbnail images, or other suitable application launch elements. The visual representation 214 may be accessible via a task bar 212 as shown. Visual representation may also be available via other control areas, such as a menu system, desktop links, via an application picker window, and so forth.

By way of example, view "A" of FIG. 6 depicts a source in the form of a window for application 602 that is in a running state. Content 604 is represented as being exposed or otherwise accessible via the source window. Interaction 606 is shown to relocate the content 604 to a target, which in this example is a visual representation 214 corresponding to application D within the task bar 212. The visual representation 214 may be an icon, captured image, tile or other suitable element which is associated with application D. Application D is representative of a non-running application. The visual representation 214 in the task bar may be selectable directly (e.g., outside of operations to relocate/transfer content) to launch application D in a conventional manner. In accordance with techniques described herein, the visual representation 214 may also be used as a target of interaction 606 to relocate the content, and launch the application into a running state in combination with the relocation. Thus, the visual representation 214 may be configured to serve multiple purposes, which include acting as an application launch element and facilitating transfer to a non-running applications as discussed herein.

Thus, responsive to the interaction 606 shown in view "A", application D corresponding to the visual representation 214 may be launched and a window for application D 608 may be exposed in the user interface 202 as shown in view "B" of FIG. 6. The window for application D 608 is represented as being launched into a running state and as including or otherwise providing access to the content 604 that is transferred.

Figure 7:
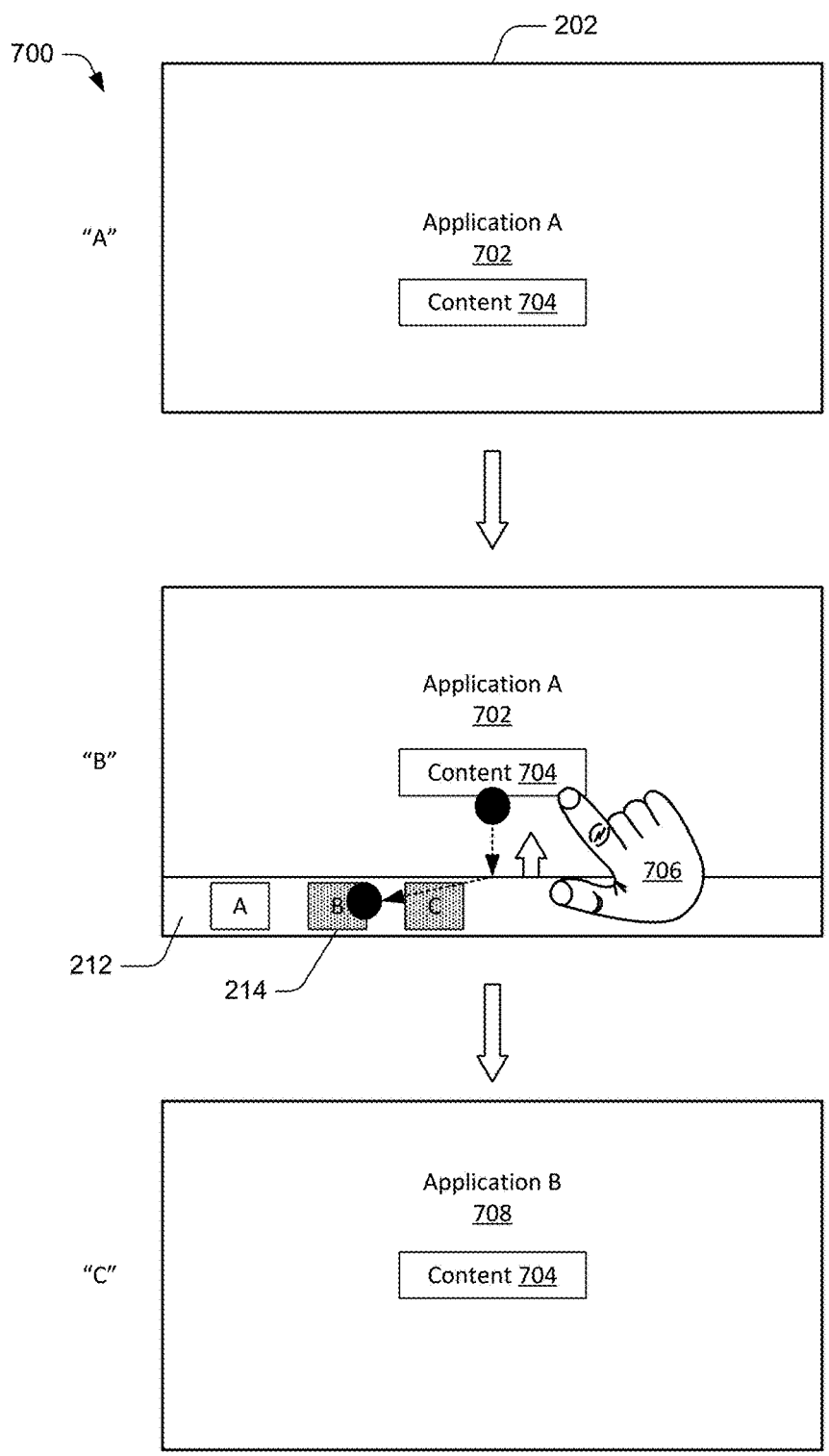
FIG. 7 illustrates an additional example scenario for transfer of content in a multi-application environment in accordance with one or more implementations.

FIG. 7 illustrates generally at 700 an additional example scenario for transfer of content in a multi-application environment in accordance with one or more implementations. In this scenario, content transfer between applications in a full screen mode for the application windows is represented. In the full screen mode, an application window may be rendered to substantially occupy visible and/or available area of a display screen. As such, edges of the application window may be extended to align with respective edges of the screen or available area of the display device.

Thus, view "A" of FIG. 7 shows a window for application A 702 in a full screen mode. Content 704 is also shown as being exposed via the window. View "B" represents interaction 706 to cause transfer of the content 704 that may involve various techniques and types of input, examples of which were discussed previously. Interaction 706 may involve selecting the content and then accessing an application picker to select a target for the content. In the particular example shown, the application picker is configured as a task bar 212 as mentioned previously. In this case, the task bar 212 is configured to automatically hide off screen when not in use and as such the task bar 212 does not appear in view "A". Responsive to interaction 706, the task bar 212 may appear such as by popping or sliding out. The task bar 212 may expose various visual representation 214 of applications that may be used as targets to effectuate a transfer of the content 704.

Thus, in operation a user may select and drag/move the content downward as shown in view "B", which exposes the task bar 212 and potential targets. Then, interaction 706 may continue by positioning the content 704 over a selected target, which in this example is a visual representation 214 in the task bar 212 for application B. Concluding the interaction 706 with the content positioned within boundaries defined for the visual representation 214 for application B indicates a selection of application B as the target. Accordingly, this initiates transfer of data for the content 704 to application B and launch of application B in the manner discussed above and below.

In the full screen mode represented in FIG. 7, the target application may be launched to replace the source application in the full screen view. Accordingly, view "C" of FIG. 7 shows a window for application B 708 having the content 704 as being presented in a full screen mode. As further shown in view "C" of FIG. 7, the task bar 212 may once again automatically hide off screen after the interaction 706 in view "B" concludes.

Figure 8:
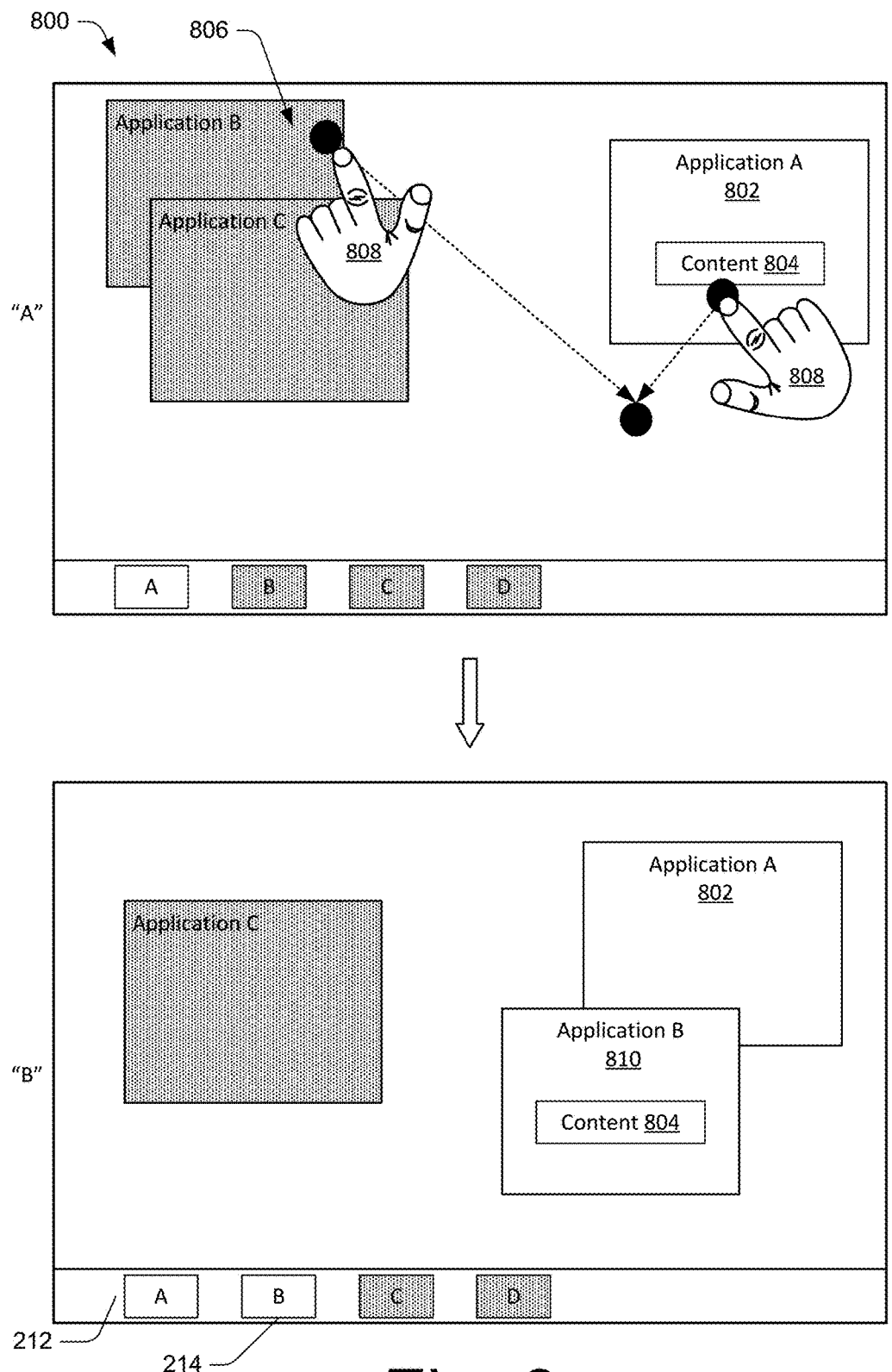
FIG. 8 illustrates an additional example scenario for transfer of content in a multi-application environment in accordance with one or more implementations.

FIG. 8 illustrates generally at 800 an additional example scenario for transfer of content in a multi-application environment in accordance with one or more implementations. The example of FIG. 8 involves multi-touch and/or multi-input interaction to rearrange a target window and relocate content in a combined manner. For example, view "A" in FIG. 8 depicts a window for application A 802 having content 804 as a source and a window within an arrangement 806 of multiple windows as a target. Rather than dragging the content into the arrangement 806 in the manner discussed in relation to FIG. 5, the user here may take advantage of multi-touch/multi-input capabilities of the system to select and rearrange a target window in the arrangement 806 of windows substantially as part of interaction 808 to relocate the content 804. Here, a user may substantially at the same time provide input to select and move a window in the arrangement 806 and select and move the content 804 from the source window to a selected position within the user interface 202 as represented in view "A".

The interaction 808 may involve two hands as shown, multiple fingers of one hand, a combination of two input devices (e.g., mouse and stylus), touch input and input from a mouse, stylus or other device, and so forth. The represented example, shows selection of a window for application B from the arrangement 806 as the target and movement of both the window and content 804 to a position just below the window for application A 802. In other words, the target and content are brought together in a selected location via the interaction, which triggers the transfer of content and activation of application B in the manner previously discussed.

View "B" of FIG. 8 shows results of the multi-touch/multi input interaction 808 of view "A". In this view, a window for application B having the content 804 is depicted as being rendered at approximately the location chosen via the interaction 808. Application B is represented as being in a running state via shading of the corresponding window in view "B." The corresponding visual representation 214 for application B in the task bar 212 also once again reflects the change in state of application B from non-running to running that is caused by the interaction 808.

Figure 9:
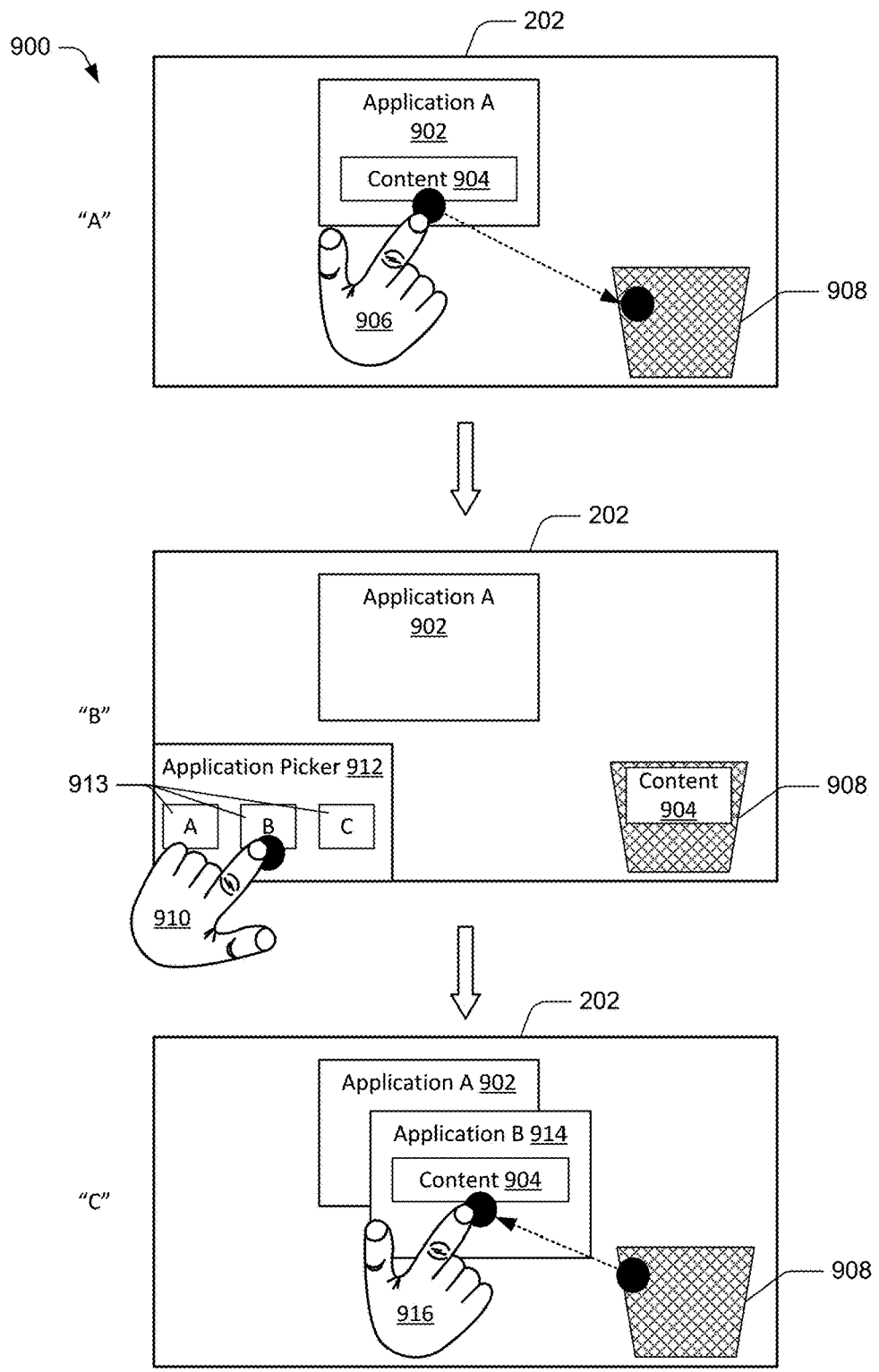
FIG. 9 illustrates yet another example scenario for transfer of content in a multi-application environment in accordance with one or more implementations.

FIG. 9 illustrates generally at 900 yet another example scenario for transfer of content in a multi-application environment in accordance with one or more implementations. In this example, transfer of content from a source to a target makes use of a basket element. When using the basket element, a transfer of content from a source to a target involves interaction to first place the content item within the basket element, which is configured to act as an intermediate holding place. Then, navigation may occur to arrange the target within the graphical user interface, such as by rearranging windows within an arrangement of multiple windows, selecting a target, and/or using a visual representation 214 and/or application picker functionality to launch a target application. Thereafter, input may be provided to move the content item from the basket element to the target element as arranged in the graphical user interface. The basket element technique may be used to facilitate a transfer to a target that may be concealed partially or fully by other windows as wells as to targets that are hidden or located off screen.

For example, view "A" of FIG. 9 illustrates a window for application A 902 having content 904. Interaction 906 is represented to relocate the content using a basket element 908. The basket element 908 may be configured as any suitable user interface instrumentality that may operate as a holding place for content as part of a content transfer. In this example, the basket element 908 is shown as an icon representative of a basket that is available as an item in the workspace/desktop of the user interface 202. A basket element 908 may also be made available via a menu system, as task bar item, as a slide out or pop-up frame, or otherwise.

Placement of content within the basket element 908 may occur via a drag and drop operation (as illustrated) or other suitable input. View "B" of FIG. 9 illustrates content 904 as being associated with and accessible via the basket element 908 responsive to the interaction 906. Arrangement of a target window or other target to receive the content 904 may then occur with the basket element 908 acting as an intermediate holding place for the content. Using the basket element 908 enables navigation to occur between different application windows, targets, screens, pages, and so forth that may be accessible via the user interface 202. For instance, following placement of the content in the basket, a source application may be closed or hidden, selection of a target from within an arrangement of multiple window (similar to the arrangement 506 of FIG. 5) may occur, and/or other actions to arrange application windows and pick a target may be performed. In an immersive environment or other full screen mode, the bucket element may be used to facilitate a switch from a full screen presentation of the source to a full screen presentation of the target.

By way of example and not limitation, view "B" of FIG. 9 depicts interaction 910 with an application picker 912 that may be configured in various ways. The application picker 912 represents but one example of an application-launching interface that may be provided via a system-interface module 120 or otherwise. Application picker 912 includes visual representations 913 of corresponding applications that may be selected to launch the applications. Visual representations 913 are comparable to visual representations 214 discussed previously herein and may be configured in the same or similar ways. For example, the visual representations 913 may be configured as icons, tiles, captured images, list items, or other representations of applications.

In the depicted example, application picker 912 is configured as a menu window that may be exposed via the user interface 202. In one approach, the application picker 912 may be accessible via a dedicated control in the user interface, such as a home or start button. Application picker 912 may also be accessible via designated gestures and/or hardware input. Application picker 912 may also be configured as a start or home screen for the multi-application environment. A variety of other configurations of an application picker 912 suitable to facilitate selection of, launching, and switching between applications are contemplated.

Interaction 910 with an application picker 912 is effective to launch a selected application and/or expose a corresponding window for the application. The interaction is also effective to switch the application into a running state. Here, interaction 910 corresponds to a selection of a visual representation 913 for application B as a target. Accordingly, view "C" of FIG. 9 depicts a window for application B 914 as being launched and arranged within the user interface 202. Now, interaction 916 may occur to relocate the content 904 from the basket element 908 to the window for application B 914 as further represented in view "C". Interaction 916 may involve a drag and drop operation as discussed herein or other suitable input to cause the relocation, examples of which have been discussed in relation to the previous examples.

Figure 10:
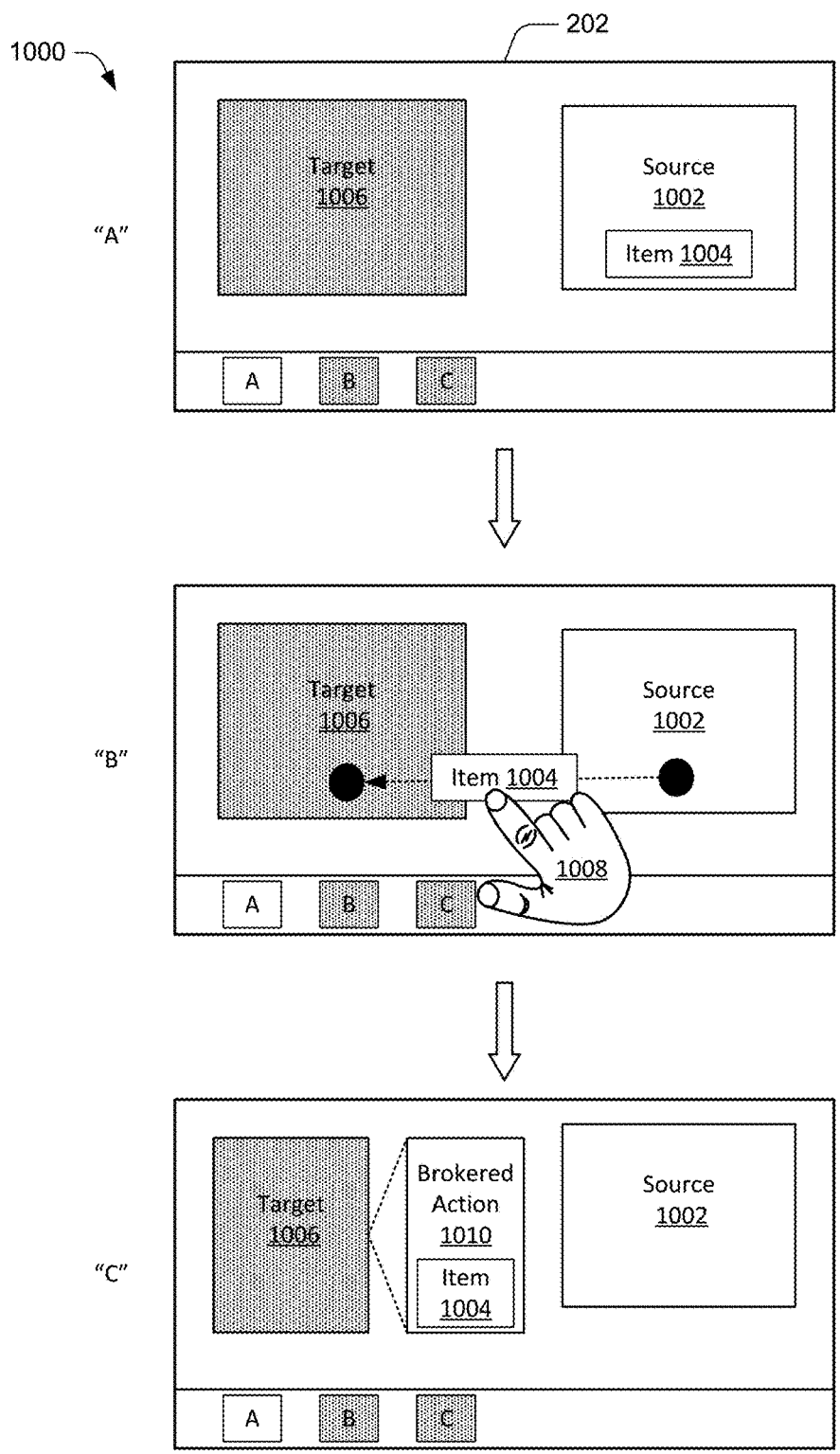
FIG. 10 illustrates an example scenario for transfer of a content item from a source to a target in accordance with one or more implementations.

FIG. 10 illustrates generally at 1000 an example scenario for transfer of a content item from a source to a target in accordance with one or more implementations. In this scenario, content transfer may occur from a source to a target that is not configured to support data transfer using the type of interaction used for the transfer. For example, some targets may not be configured to natively support drag and drop as a mechanism to transfer content directly to the target. This may be so for some types of applications as well as targets that represent entities such as people, groups, devices, appliances, web sites and web locations and so forth. In order to enable content transfer for such targets, brokered actions may be enabled by the system.

Here, the operating system 116 by way of the application manager 128 or otherwise may provide functionality to perform brokered actions on behalf of targets. In the brokered action approach, relocation of an item of content to a target is effective to trigger a brokered action associated with the target. Brokered actions may be set for targets based on various criteria, such as the type of target, the kind of source content, target groupings, and so forth. The brokered actions may be performed using operating system components that act on behalf of the target. For example, an item may be emailed by system components automatically to a user associated with an entity target that corresponds to the user. In another example, an item in the form of a command may be automatically sent to a smart appliance (e.g., a smart thermostat, pet feeder, lighting system, coffee maker, etc.) associated with an entity target that corresponds to the smart appliance. Further, a picture dropped on a target that represents a social network service/site may automatically be shared/posted to the site.

These and other examples of brokered actions may occur through the operating system components and/or without activating or launching an application that underlies the target. Instead, the operating system may be configured to support different kinds of brokered actions (e.g., sharing an item, sending a command, performing a formatting action, sending a message, etc.) that may be associated with targets and launch when appropriate content is dropped upon or otherwise relocated to the target.

In this context, view "A" of FIG. 10 depicts a source 1002 having an item 1004 of content and a target 1006. As in previous scenarios, the source 1002 may be in an active running state and expose the item 1004 for selection and transfer to the target 1006 (or a different target). The target 1006 may represent an application window for an application in a non-running state. Alternatively, the target 1006 may represent a visual representation of an entity, such as a person, group, location, or thing (e.g., computing device, smart appliance, etc.). The target 1006 may be associated with an action such as launch and/or restore of a related app, prompting the user to choose an app, sending of a command to an entity corresponding to the target, or display of a dialog or interface elements to facilitate completion of actions by a user.

View "B" of FIG. 10 depicts interaction 1008 that may occur to effectuate the transfer of the item 1004 from the source 1002 to the target 1006. The interaction 1008 may be a drag and drop or any other suitable form of input, examples of which are discussed throughout this document. In this case, the target 1006 represents a target that does not support the particular interaction 1008 that is employed to relocate the item. For example, the target 1006 may not support transfer of the item directly to the target through drag and drop.

However, the system may enable a brokered action 1010 for the target 1006 with respect to the item 1004 as represented in view "C". Thus, relocation of the item 1004 via the interaction 1008 may trigger the brokered action 1010. Various brokered actions are contemplated some examples of which were previously discussed. Notice that the target 1006 remains shaded in view "C" to represent that the brokered action 1010 is performed by system components on behalf of the target. As such, the target 1006 and/or a corresponding application may remain in a non-running state since the actions on the item are performed by the system instead of by the application/target itself.

As noted, brokered actions may occur in dependence upon the type of content being transfer. In an implementation, targets may be configured to trigger both brokered actions and direct actions by the target/application based on the type of content relocated to the target, the source of the target, the type of interaction, and/or other contextual criteria. For example, an image item may cause a brokered share action with respect to a target whereas as a data object transfer to the same target may cause launch of an application underlying the target to perform actions to edit or format the object. Thus, a single target may trigger multiple different responses depending upon the context in which an item is being transferred to the target.

Additional details regarding these and other aspects of content transfers to non-running targets are discussed in relation to the following example procedures.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the examples of FIGS. 2-10. By way of example, aspects of the procedures may be performed by a suitably configured computing device, such as by a computing device 102 as in FIG. 1 that includes or makes use of an operating system 116, multi-application environment 118, application manager 128, and/or other components.

Functionality, features, and concepts described in relation to the examples of FIGS. 1-10 may be employed in the context of the procedures described herein. Further, functionality, features, and concepts described in relation to different procedures below may be interchanged among the different procedures and are not limited to implementation in the context of an individual procedure. Moreover, blocks associated with different representative procedures corresponding figures herein may be applied together and/or combined in different ways. Therefore, it is to be appreciated that individual functionality, features, and concepts described in relation to different example environments, devices, components, figures, and procedures throughout this document may be used in any suitable combinations and are not limited to the particular combinations represented by the enumerated examples.

Figure 11:
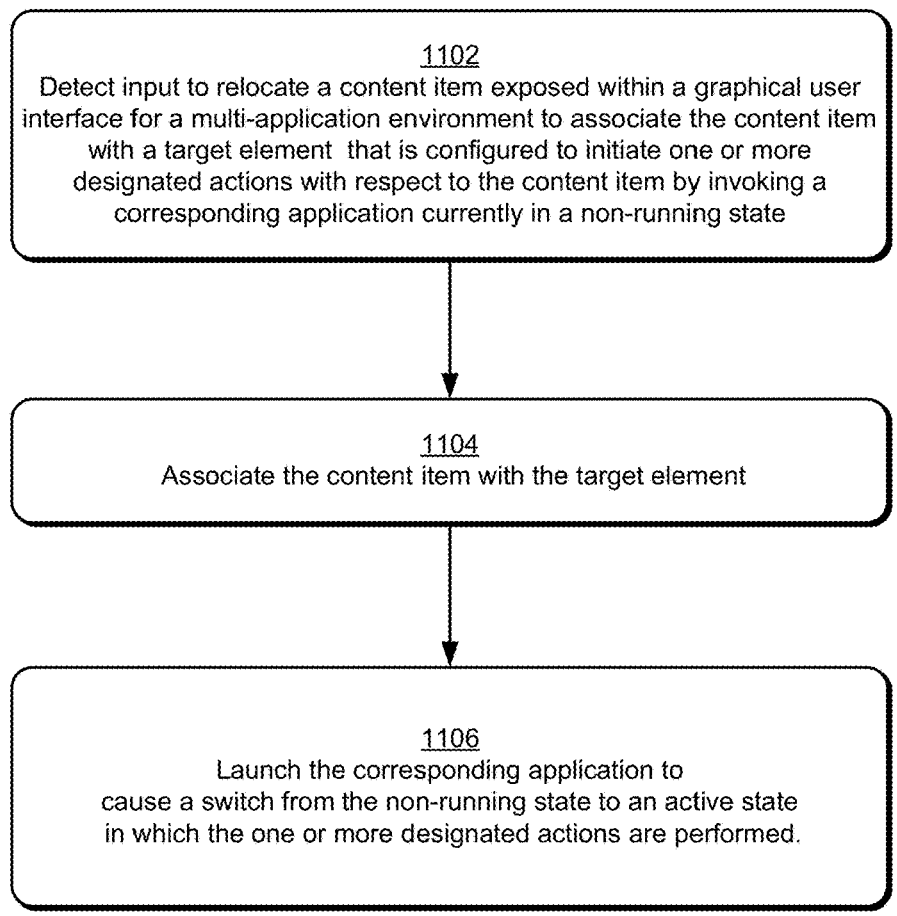
FIG. 11 is a flow diagram depicting an example procedure in which a content items is relocated in accordance with one or more implementations.

FIG. 11 is a flow diagram depicting an example procedure 1100 in which a content items is relocated in accordance with one or more implementations. Input to relocate a content item exposed within a graphical user interface for a multi-application environment is detected to associate the content item with a target element that is configured to initiate one or more designated actions with respect to the content item by invoking a corresponding application currently in a non-running state (block 1102). For example, an application manager 128 or comparable functionality of a computing device may operate to recognize and process input indicative of a transfer of content between a source and target. Various techniques and types of interaction effective to cause such content transfers are discussed in relation to the foregoing example scenarios. As noted, the target element involved in the transfer may be an application window or other representation of an application or entity that is in a non-running state (e.g., closed or suspended).

Responsive to the detected input, the content item is associated with the target element (block 1104) and the corresponding application is launched to cause a switch from the non-running state to an active state in which the one or more designated actions are performed (block 1106). Associating the content item with the target element may occur in any suitable way. For example, data for the content item may be transferred to memory allocated to the application and subsequently loaded or rendered via the application. The transfer may involve moving the content item and/or making a copy of the item for use by the target. In addition, the application that was previously in a non-running state is launched into an active, running state. In the active, running state, the application may operate upon the item to perform designated actions automatically. In addition or alternatively, a user may take advantage of functionality provided via the application to interact with the content item in various ways supported by the application.

Figure 12:
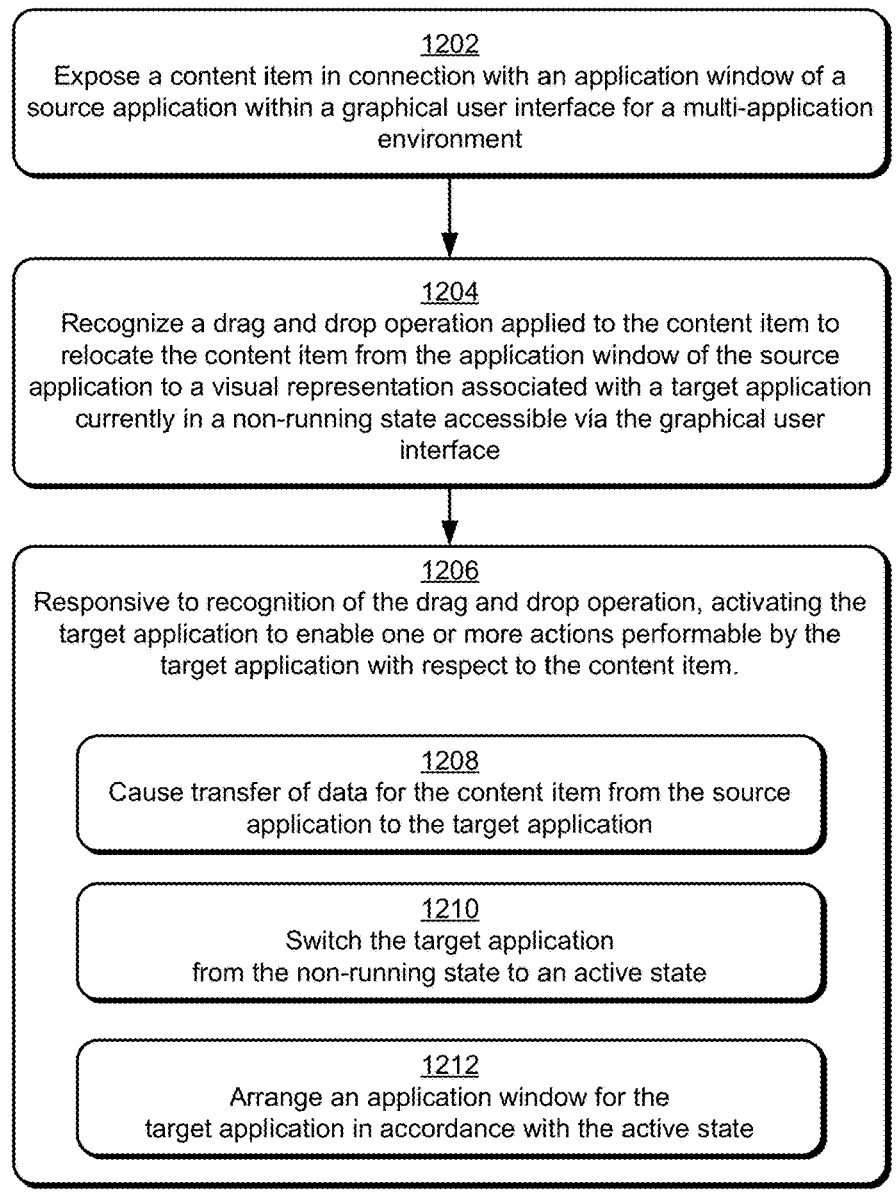
FIG. 12 is a flow diagram depicting an example procedure in which a drag and drop operation occurs to transfer data for a content item from a source application to a target application in accordance with one or more implementations.

FIG. 12 is a flow diagram depicting an example procedure 1200 in which a drag and drop operation occurs to transfer data for a content item from a source application to a target application in accordance with one or more implementations. A content item is exposed in connection with an application window of a source application within a graphical user interface for a multi-application environment (block 1202). For example, a user interface 202 as described throughout this document may be configured in various ways to facilitate interaction with multiple applications and corresponding windows. The interface may include both running and non-running windows/items as noted previously. Content may be accessible via at least some windows for the applications. The content may be selected and transferred to a target window or other target element associated with a different application or entity.

A drag and drop operation is recognized as being applied to the content item to relocate the content item from the application window of the source application to a visual representation associated with a target application currently in a non-running state accessible via the graphical user interface (block 1204). Drag and drop operations may be used to effectuate transfer of content in various ways, examples of which include the scenarios discussed in relation to FIGS. 2-10. Generally, the drag and drop operation is applied to select an item for a source, move the item to a target, and place the item proximate to the target. For example, a drag and drop may be used to relocate content between application windows corresponding to different application as represented and discussed in relation to the example scenario of FIG. 3e.

Responsive to recognition of the drop and drag operation, the target application is activated to enable one or more actions performable by the target application with respect to the content item (block 1206). Actions may include direct actions performed by the application automatically or in response to user input to invoke functionality of the application. Brokered actions that are performed on behalf of the target by system components or other components separate from the target are also contemplated. Further, activation of the target application may include operations to at least cause transfer of data for the content item from the source application to the target application (block 1208), switch the target application from the non-running state to an active state (block 1210), and arrange an application window for the target application in accordance with the active state (block 1212). Arrangement of the application window may involve rendering the window in a user interface 202 for a multi-application environment. Additionally, the window may be arranged in a foreground position within an arrangement of multiple windows. Interaction may then occur with functionality provided by the application to perform actions on the content item in the manner discussed herein.

Figure 13:
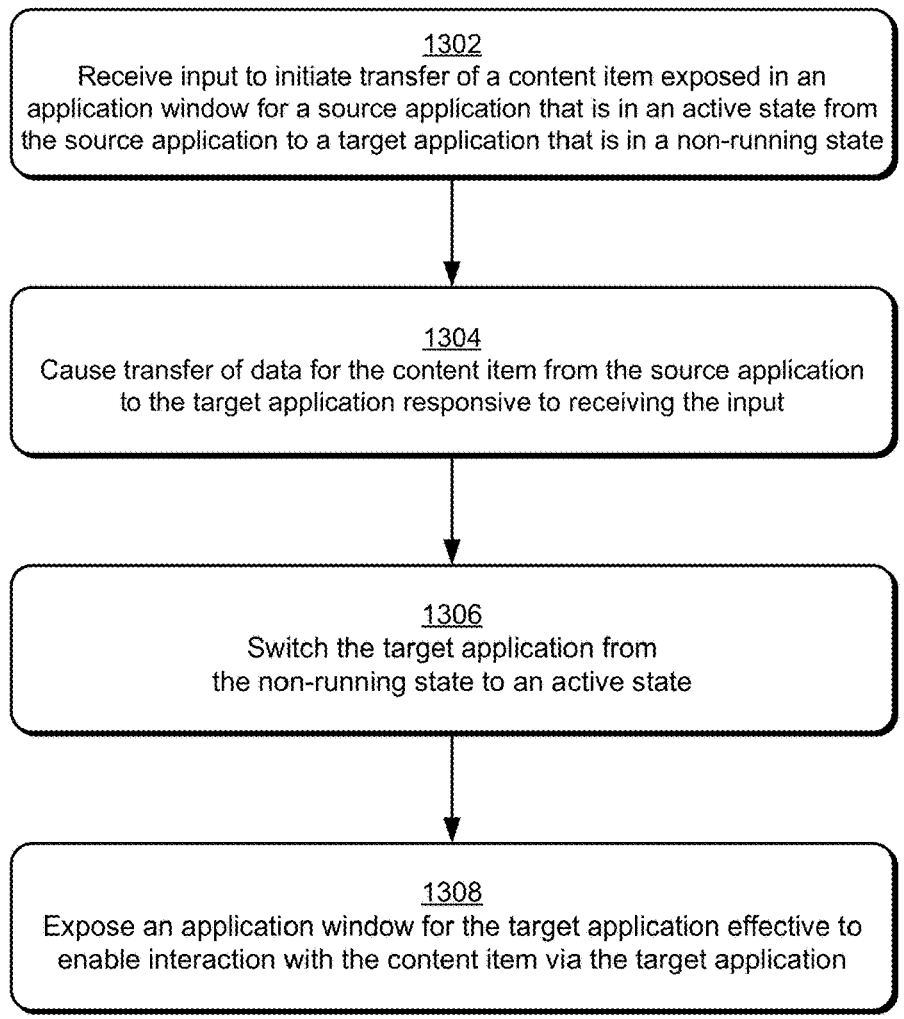
FIG. 13 is a flow diagram depicting an example procedure in which a content item exposed in an application window for a source application that is in an active state is transferred from the source application to a target application that is in a non-running state in accordance with one or more implementations.

FIG. 13 is a flow diagram depicting an example procedure 1300 in which a content item exposed in an application window for a source application that is in an active state is transferred from the source application to a target application that is in a non-running state in accordance with one or more implementations. Input is received to initiate transfer of a content item exposed in an application window for a source application that is in an active state from the source application to a target application that is in a non-running state (block 1302). Various kinds of interaction and input to perform a data transfer are contemplated including but not limited to the examples discussed herein. In one particular example the input corresponds to a drag and drop operation applied to select the content item, drag the content item from a position within the application window for the source application, and drop the content item within boundaries of a visual representation of the target application.

Transfer of data for the content item from the source application to the target application is caused responsive to receiving the input (block 1304) and the target application is switched from the non-running state to an active state (block 1306). In addition, an application window for the target application is exposed that is effective to enable interaction with the content item via the target application (block 1308). In the example of a drag and drop operation, the dropping of the content item within the boundaries of visual representation is effective to trigger the causing of the transfer, switching of states, and exposing the application window.

Having considered some example procedures, consider now a discussion of an example system and devices that may be employed in one or more implementations.

Example System and Device

Figure 14:
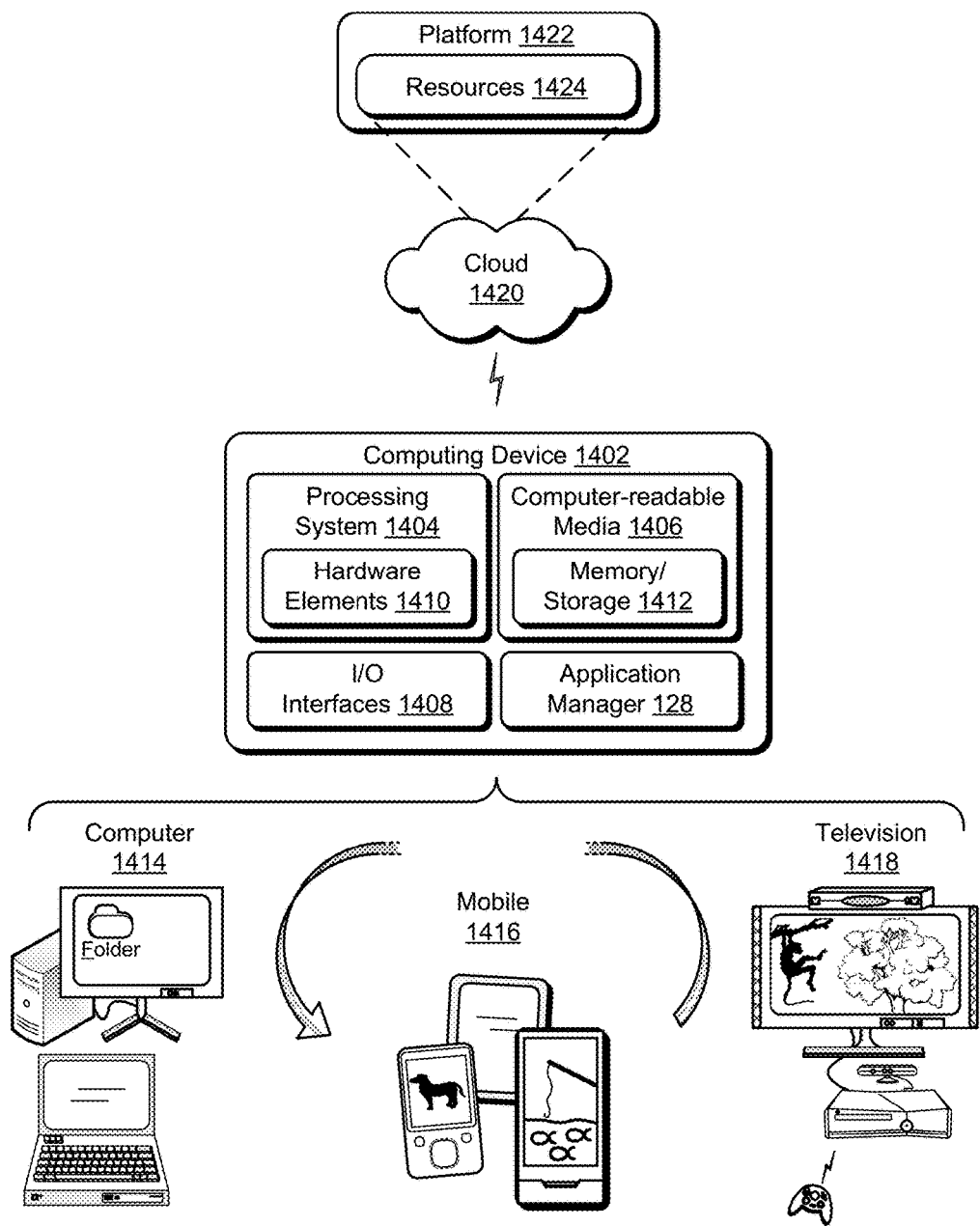
FIG. 14 illustrates an example system having devices and components that may be employed to implement aspects of the techniques described herein.

FIG. 14 illustrates an example system generally at 1400 that includes an example computing device 1402 that is representative of one or more computing systems and/or devices that may implement the various techniques described herein. The computing device 1402 may be, for example, a server of a service provider, a device associated with the client (e.g., a client device), an on-chip system, and/or any other suitable computing device or computing system.

The example computing device 1402 as illustrated includes a processing system 1404, one or more computer-readable media 1406, and one or more I/O interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1406 is illustrated as including memory/storage 1412. The memory/storage 1412 represents memory/storage capacity associated with one or more computer-readable media. The memory/storage 1412 may include volatile media (such as random access memory (RAM)) and/or nonvolatile media (such as read only memory (ROM), Flash memory, optical disks, magnetic disks, and so forth). The memory/storage 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 1402, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including operating system 116, multi-application environment module 118, applications 124, application manager 128 and other program modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of modules as a module that is executable by the computing device 1402 as software may be achieved at least partially in hardware, e.g., through use of computer-readable storage media and/or hardware elements 1410 of the processing system. The instructions and/or functions may be executable/operable by one or more articles of manufacture (for example, one or more computing devices 1402 and/or processing systems 1404) to implement techniques, modules, and examples described herein.

As further illustrated in FIG. 14, the example system 1400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1402 may assume a variety of different configurations, such as for computer 1414, mobile 1416, and television 1418 uses. Each of these configurations includes devices that may have generally different constructs and capabilities, and thus the computing device 1402 may be configured according to one or more of the different device classes. For instance, the computing device 1402 may be implemented as the computer 1414 class of a device that includes a personal computer, desktop computer, a multi-screen computer, laptop computer, netbook, and so on.

The computing device 1402 may also be implemented as the mobile 1416 class of device that includes mobile devices, such as a mobile phone, portable music player, portable gaming device, a tablet computer, a multi-screen computer, and so on. The computing device 1402 may also be implemented as the television 1418 class of device that includes devices having or connected to generally larger screens in casual viewing environments. These devices include televisions, set-top boxes, gaming consoles, and so on.

The techniques described herein may be supported by these various configurations of the computing device 1402 and are not limited to the specific examples of the techniques described herein. This is illustrated through inclusion of the application manager 128 on the computing device 1402. The functionality of the application manager 128 and other modules may also be implemented all or in part through use of a distributed system, such as over a "cloud" 1420 via a platform 1422 as described below.

The cloud 1420 includes and/or is representative of a platform 1422 for resources 1424. The platform 1422 abstracts underlying functionality of hardware (e.g., servers) and software resources of the cloud 1420. The resources 1424 may include applications and/or data that can be utilized while computer processing is executed on servers that are remote from the computing device 1402. Resources 1424 can also include services provided over the Internet and/or through a subscriber network, such as a cellular or Wi-Fi network.

The platform 1422 may abstract resources and functions to connect the computing device 1402 with other computing devices. The platform 1422 may also serve to abstract scaling of resources to provide a corresponding level of scale to encountered demand for the resources 1424 that are implemented via the platform 1422. Accordingly, in an interconnected device embodiment, implementation of functionality described herein may be distributed throughout the system 1400. For example, the functionality may be implemented in part on the computing device 1402 as well as via the platform 1422 that abstracts the functionality of the cloud 1420.

Example Implementations

Example implementations of content transfer to non-running targets described herein include, but are not limited to, one or any combinations of one or more of the following examples:

A computer-implemented method comprising: detecting input to relocate a content item exposed within a graphical user interface for a multi-application environment to associate the content item with a target element configured to initiate one or more designated actions with respect to the content item by invoking a corresponding application currently in a non-running state; and responsive to the input: associating the content item with the target element; and launching the corresponding application to cause a switch from the non-running state to an active state in which the one or more designated actions are performed.

The computer-implemented method as described above, further comprising, responsive to the input, visually representing in the graphical user interface movement of the content item from a location within an application window for a source application that is a source of the content item to the target element.

The computer-implemented method as described above, wherein the target element comprises a visual representation of the corresponding application that is selectable to launch the corresponding application into the active state.

The computer-implemented method as described above, wherein the target element comprises a captured image of an application window for the corresponding application, the corresponding application being launchable into the active state responsive to the input to relocate the content item to within boundaries of the captured image.

The computer-implemented method as described above, wherein the target element is a window for the corresponding application that is displayed within the graphical user interface for the multi-application environment.

The computer-implemented method as described above, wherein the target element is an application launch element displayed via an application picker accessible via the graphical user interface for the multi-application environment, the application launch element selectable to launch the corresponding application.

The computer-implemented method as described above wherein the input comprises a drag and drop operation applied to select the content item, move the content item to a position within the graphical user interface at which the target element is located, and drop the content item within boundaries associated with the target element.

The computer-implemented method as above, wherein the input to relocate comprises input to identify the content item, activate a relocation mode, and pick the target element.

The computer-implemented method as described above, wherein the input to relocate the content item includes: input to place the content item within a basket element configured to act as an intermediate holding place; navigation to arrange the target element within the graphical user interface; and input to move the content item from the basket element to the target element as arranged in the graphical user interface.

The computer-implemented method as described above, wherein the target element represents an entity and the corresponding application is a system component launched responsive to association of the content item with the target element to perform a brokered action defined for the entity.

The computer-implemented method as above, wherein the input is received via touch input, mouse input, touchpad input, keyboard input, voice input, or stylus input.

A system comprising: a processing system; one or more computer-readable media storing processor-executable instructions that, responsive to execution by the processing system, perform operations comprising: exposing a content item in connection with an application window of a source application within a graphical user interface for a multi-application environment; recognizing a drop and drag operation applied to the content item to relocate the content item from the application window of the source application to a visual representation associated with a target application currently in a non-running state accessible via the graphical user interface; and responsive to recognition of the drop and drag operation, activating the target application to enable one or more actions performable by the target application with respect to the content item.

The system as described above, wherein activating the target application includes: causing transfer of data for the content item from the source application to the target application; switching the target application from the non-running state to an active state; and arranging an application window for the target application in accordance with the active state.

The system as described above, wherein visual the representation associated with a target application comprises a captured image of an application window for the target application displayed within the graphical user interface, the captured image captured when the target application was previously in an active state.

The system as described above, wherein the visual representation associated with a target application comprises an application launch element for the target application displayed via application picker accessible via the graphical user interface.

The system as described above, wherein recognizing the drag and drop operation includes detecting multiple inputs to arrange the visual representation within the graphical user interface in a selected location and move the content item to the selected location.

The system as described above, wherein: exposing the content item comprises rendering the content item in connection with a full display view of the application window for the source application; and activating the target application comprises replacing the full display view of the application window for the source application with a full display view of an application window for the target application.

One or more computer-readable storage media storing processor-executable instructions that, responsive to execution by a processing system of a computing device, implement an operating system to perform operations comprising: receiving input to initiate transfer of a content item exposed in an application window for a source application that is in an active state from the source application to a target application that is in a non-running state; causing transfer of data for the content item from the source application to the target application responsive to receiving the input; switching the target application from the non-running state to an active state; and exposing an application window for the target application effective to enable interaction with the content item via the target application.

The one or more computer-readable storage media as described above, wherein the input comprises a drag and drop operation applied to select the content item, drag the content item from a position within the application window for the source application, and drop the content item within boundaries of a visual representation of the target application, dropping of the content item within the boundaries of visual representation effective to trigger the causing, switching, and exposing.

The one or more computer-readable storage media as described above, the input to initiate the transfer comprises relocation of the content item to a visual representation of the target application exposed within an a graphical user interface for the operating system, the visual representation selectable to launch the target application.

CONCLUSION

Although embodiments of techniques and apparatuses enabling adaptive sizing and positioning of application windows have been described in language specific to features and/or methods, it is to be understood that the subject of the appended claims is not necessarily limited to the specific features or methods described. Rather, the specific features and methods are disclosed as example implementations enabling adaptive sizing and positioning of application windows.

What is claimed is:

1. A computer-implemented method comprising:
   detecting input to relocate a content item exposed within a graphical user interface for a multi-application environment to associate the content item with a target element configured to initiate one or more designated actions with respect to the content item by invoking a corresponding application currently in a non-running state;
   the input to relocate the content item including the content item being placed at an intermediate holding place that is displayed within the graphical user interface, and the content item being copied from the intermediate holding place to the target element; and
   responsive to the input that associates the content item with the target element, launching the corresponding application that switches from the non-running state to an active state in which the one or more designated actions are performed.

2. The computer-implemented method as described in claim 1, further comprising, responsive to the input, visually representing in the graphical user interface movement of the content item being copied from the intermediate holding place to the target element.

3. The computer-implemented method as described in claim 1, wherein the target element comprises a visual representation of the corresponding application that is selectable to launch the corresponding application into the active state.

4. The computer-implemented method as described in claim 1, wherein the target element comprises a captured image of an application window for the corresponding application, the corresponding application being launchable into the active state responsive to the input to relocate the content item to within boundaries of the captured image.

5. The computer-implemented method as described in claim 1, wherein the target element is a window for the corresponding application that is displayed within the graphical user interface for the multi-application environment.

6. The computer-implemented method as described in claim 1, wherein the target element is an application launch element displayed via an application picker accessible via the graphical user interface for the multi-application environment, the application launch element selectable to launch the corresponding application.

7. The computer-implemented method as described in claim 6, wherein the input comprises a copy operation applied to select the content item, place the content item at the intermediate holding place, and copy the content item to a position within the graphical user interface at which the target element is located.

8. The computer-implemented method as described in claim 1, wherein the input to relocate the content item comprises input to identify the content item, activate a relocation mode, and pick the target element.

9. The computer-implemented method as described in claim 1, wherein the input to relocate the content item places the content item within a basket element configured as the intermediate holding place, and the content item is copied from the basket element to the target element.

10. The computer-implemented method as described in claim 1, wherein the target element represents an entity and the corresponding application is a system component launched responsive to association of the content item with the target element to perform a brokered action defined for the entity.

11. The computer-implemented method as described in claim 1, wherein the input is received via touch input, mouse input, touchpad input, keyboard input, voice input, or stylus input.

12. A system comprising:
   a processing system;
   one or more computer-readable media storing processor-executable instructions that, responsive to execution by the processing system, perform operations comprising:
      exposing a content item of a source application within a graphical user interface for a multi-application environment;
      associating the content item with a target element of a corresponding application currently in a non-running state, the associating including relocating the content item to an intermediate holding place that is displayed within the graphical user interface, and the content item being copied from the intermediate holding place to the target element; and
      responsive to the associating the content item with the target element, activating the corresponding application that switches from the non-running state to an active state in which one or more actions are performed.

13. The system as described in claim 12, wherein activating the corresponding application includes:
   transferring data for the content item from the source application to the corresponding application;
   switching the corresponding application from the non-running state to the active state; and
   arranging an application window for the corresponding application in accordance with the active state.

14. The system as described in claim 12, wherein a visual representation of the corresponding application comprises a captured image of an application window for the corresponding application displayed within the graphical user interface, the captured image being captured when the corresponding application was in a previous active state.

15. The system as described in claim 12, wherein a visual representation of the corresponding application comprises an application launch element for the corresponding application displayed in an application picker accessible via the graphical user interface.

16. The system as described in claim 12, wherein associating the content item with the target element of the corresponding application includes detecting multiple inputs to arrange a visual representation of the corresponding application in a selected location within the graphical user interface and copying the content item to the selected location.

17. The system as described in claim 12, wherein:
   exposing the content item comprises rendering the content item in a full display view of an application window for the source application; and
   activating the corresponding application comprises replacing the full display view of the application window for the source application with a full display view of an application window for the corresponding application.

18. One or more computer-readable storage media storing processor-executable instructions that, responsive to execution by a processing system of a computing device, implement an operating system to perform operations comprising:

receiving input to initiate transfer of a content item of a source application that is in an active state from the source application to a target application that is in a non-running state, the input including multiple inputs to arrange a visual representation of the target application in a selected location of a graphical user interface and the content item being copied to the selected location;

transferring data for the content item from the source application to the target application responsive to receiving the input;

switching the target application from the non-running state to an active state; and exposing an application window for the target application effective to enable interaction with the content item via the target application.

19. The one or more computer-readable storage media as described in claim 18, wherein the input comprises a copy operation applied to select the content item, place the content item at an intermediate holding place displayed within the graphical user interface, and copy the content item to within boundaries of a visual representation of the target application.

20. The one or more computer-readable storage media as described in claim 18, wherein the input to initiate the transfer of the content item comprises relocation of the content item to a visual representation of the target application exposed within the graphical user interface for the operating system, the visual representation selectable to launch the target application.

* * * * *